US 6,241,935 B1

(12) United States Patent
Beane et al.

(10) Patent No.: US 6,241,935 B1
(45) Date of Patent: *Jun. 5, 2001

(54) PULSED PRESSURIZED POWDER FEED SYSTEM AND METHOD FOR UNIFORM PARTICULATE MATERIAL DELIVERY

(75) Inventors: Glenn L. Beane, Hanover; David S. Lashmore, Lebanon, both of NH (US)

(73) Assignee: Materials Innovation, Inc., West Lebanon, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/281,411

(22) Filed: Mar. 30, 1999

Related U.S. Application Data

(60) Division of application No. 08/947,071, filed on Oct. 8, 1997, now Pat. No. 5,897,826, and a continuation-in-part of application No. 08/953,275, filed on Oct. 17, 1997, now Pat. No. 5,945,135, which is a division of application No. 08/947,071, which is a continuation-in-part of application No. 08/705,434, filed on Aug. 29, 1996, now Pat. No. 5,885,625.
(60) Provisional application No. 60/038,186, filed on Feb. 14, 1997, and provisional application No. 60/019,945, filed on Jun. 14, 1996.

(51) Int. Cl.⁷ .................................................. B29C 43/02
(52) U.S. Cl. .......................... 264/437; 264/442; 264/517; 264/109; 425/77; 425/78; 425/174.8; 425/258; 425/425; 419/66
(58) Field of Search ..................................... 264/437, 442, 264/517, 109; 425/174.2, 77, 78, 258, 425, 260; 419/66

(56) References Cited

U.S. PATENT DOCUMENTS

| | | |
|---|---|---|
| 2,303,288 | 11/1942 | Lester . |
| 2,514,486 | 7/1950 | Green . |
| 2,598,016 | 5/1952 | Richardson . |
| 2,800,684 | 7/1957 | Luthman . |
| 2,967,613 | 1/1961 | Ellis et al. . |
| 3,020,589 | 2/1962 | Maritano . |
| 3,154,812 | 11/1964 | Haller . |
| 3,183,570 | 5/1965 | Vogt . |
| 3,191,232 | 6/1965 | Haller . |
| 3,574,892 | 4/1971 | Smith . |
| 3,605,825 | 9/1971 | Hermes . |
| 3,647,333 | 3/1972 | Smith . |
| 3,690,805 | 9/1972 | Kopicko . |

(List continued on next page.)

Primary Examiner—Mary Lynn Theisen
(74) Attorney, Agent, or Firm—Fran S. Wasserman

(57) ABSTRACT

A powder feed system for delivering a quantity of particulate material to a die cavity of a powder press is provided. The powder press has a table-like platen surface which is flush with and surrounds a die in which the die cavity sits, an upper punch appending from an upper ram and a lower punch. The powder feed delivery system includes a receptacle for receiving and delivering particulate material to the cavity. The receptacle has an ingress through which particulate material is received under pressure and an egress for registering with the interior of the cavity and through which particulate material is delivered under pressure from a feed conduit to the cavity. The feed conduit is attached at a first end to the receptacle ingress. At least one pressure generator is attached to a top end of a pressure vessel attached at a second end to the feed conduit. The pressure generator provides supra atmospheric pressure to push particulate material from the vessel into the die cavity when the die cavity is sealed from the atmosphere. The pressure generator is optionally used to fluidize the particulate material within the die cavity to create a substantially uniform density distribution of the particulate material within the cavity. At least one exhaust portal is provided for releasing pressure from within the die cavity.

35 Claims, 15 Drawing Sheets

U.S. PATENT DOCUMENTS

| | | |
|---|---|---|
| 3,697,208 | 10/1972 | Munk et al. . |
| 3,752,622 | 8/1973 | Viadana . |
| 3,764,244 | 10/1973 | Hurley et al. . |
| 3,773,446 | 11/1973 | Borrini . |
| 3,788,787 | 1/1974 | Siberseisen et al. . |
| 3,972,449 | 8/1976 | Smith . |
| 3,995,979 | 12/1976 | Fedrigo . |
| 4,080,128 | 3/1978 | Schreiner et al. . |
| 4,260,346 | 4/1981 | Anderson . |
| 4,327,996 | 5/1982 | Affolder . |
| 4,352,648 | 10/1982 | Hilton . |
| 4,359,175 | 11/1982 | Lizenby . |
| 4,377,376 | 3/1983 | DeSantis . |
| 4,401,614 | 8/1983 | DeSantis . |
| 4,488,837 | 12/1984 | Mizokawa et al. . |
| 4,591,326 | 5/1986 | Adelmann . |
| 4,813,818 | 3/1989 | Sanzone . |
| 4,818,201 | 4/1989 | Howard . |
| 4,853,180 | 8/1989 | Howard . |
| 5,037,287 | 8/1991 | Hirai . |
| 5,071,289 | 12/1991 | Spivak . |
| 5,074,774 | 12/1991 | Nose et al. . |
| 5,184,754 | 2/1993 | Hansen . |
| 5,222,529 | 6/1993 | Zoltan . |
| 5,236,021 | 8/1993 | Bewlav et al. . |
| 5,253,993 | 10/1993 | Birkenstock et al. . |
| 5,256,053 | 10/1993 | Haguchi . |
| 5,269,463 | 12/1993 | Burks . |
| 5,472,661 | 12/1995 | Gay . |
| 5,629,033 | 5/1997 | Lienau . |

PULSED PRESSURIZED POWDER FEED SYSTEM AND METHOD FOR UNIFORM PARTICULATE MATERIAL DELIVERY

This application is a division of U.S. patent application Ser. No. 08/947,071, filed on Oct. 8, 1997, now U.S. Pat. No. 5,897,826, which claims the benefit of U.S. patent application Ser. No. 60/038,186, filed on Feb. 14, 1997, hereby incorporated by reference in its entirety herein, and is a continuation-in-part of Ser. No. 08/953,275, filed Oct. 17, 1997, now U.S. Pat. No. 5,945,135, which is a division of Ser. No. 08/947,071, filed Oct. 8, 1997, now U.S. Pat. No. 5,897,826, which is a continuation-in-part of U.S. patent application Ser. No. 08/705,434, filed on Aug. 29, 1996, now U.S Pat. No. 5,885,625, hereby incorporated by reference in its entirety herein, which in turn claims the benefit of provisional U.S. patent application Ser. No. 60/019,945, filed on Jun. 14, 1996, hereby incorporated by reference in its entirety herein.

BACKGROUND OF THE INVENTION

1. Field of the Invention

This invention relates generally to powder feed systems and to delivery methods for feeding and depositing finely divided or particulate material into a die cavity of a powder press for compacting. More particularly, the invention relates to a feeding system and delivery method that provides for uniform density distribution of the particles throughout the die cavity. The feeding system and delivery method also provides a uniform, predetermined constant weight of particulate material into the die cavity. In one embodiment, the invention provides an apparatus and method for delivering particulate material to the die cavity of a powder press without the use of a shuttle. The invention is also directed to a feeding system that includes a scale apparatus for accurately measuring the weight of particulate material before it is delivered to a die cavity.

2. Description of the Related Art

In powder metallurgy, products and parts are formed by pressing finely ground or atomized metal powders into a desired shape within a die cavity of a powder press.

Generally, the metal powders are compacted in the die cavity at room temperature and the then semi-dense "green" compact is removed from the die and heated at very high temperatures (at or near the melting point of the material) to bond the powders into a unified mass. The heat bonding procedure is generally known in powder metallurgy as sintering or analogously in the fields of ceramics and carbides, firing.

When these and similar procedures are employed, means are required for delivering amounts of powder or particulate material to the die cavity of the press. Typically, feed shoes operate to deliver the powder or particulate material to the die cavity during the press cycle by using a gravity fill system. This system involves the movement of the feed shoe containing particulate material on a shuttle which slides the shoe forward along the table of the die press to a position at which the bottom feed hole of the feed shoe is exposed, overlies and registers with the die cavity furnishing enough loose powder under the action of gravity to fill the die cavity volumetrically. Thereafter, the shuttle slides the shoe back along the table of the die press into a retracted position. This action cuts off the gravity induced flow of particulate material from the bottom hole of the feed shoe. The particulate material in the die cavity is then compressed into an article and the article is ejected from the die. The shuttle then slides the shoe forward along the table of the die press displacing the ejected article and again exposing the bottom hole of the feed shoe as it overlies and registers with the die cavity. Gravity is thereby once again used to fill the die cavity with particulate material more or less volumetrically. Very small recesses of the die cavity do not however fill uniformly. The feed shoe is then once again retracted to cut off the gravity flow of particulate material into the cavity.

The aforementioned typical example of a feed shoe delivers particulate material by volume (volumetric). Such volumetric feed shoes depend on a consistent bulk density and good flow characteristics (low Hall Numbers) of the powder material they are delivering for an accurate and uniform feed rate. However, because many of the powdered materials used are heavy and dense, they have a tendency to self compact. Furthermore, the die cavities used to make very large parts with fine detail are particularly difficult to fill uniformly. Thus, these and other volumetric feed shoes and delivery methods are generally inadequate and unsatisfactory to provide for very precise uniform distribution and hence density of the powder throughout the die cavity. Consequently, the density of parts made from these powder compacts is not uniform throughout and is not consistently uniform from part to part. These parts are then prone to stress related cracking, especially upon ejection from the die cavity. To make matters worse, the cracks oftentimes become visible only upon sintering.

Additionally, complex part shapes and parts having tight dimensional tolerances such as helical gears and sprockets cannot be satisfactorily produced using commonly available powder feed methods and feed shoes. Since these prior art methods and feed shoes use gravity alone to induce the flow of the particulate material into the die cavity and are thus unable to deliver powder uniformly to all regions of the complex die shapes needed to produce an item such as a helical gear or sprocket.

Specifically, powder simply falls from the feed shoe into the die without any particular pattern or regularity of density. Certain regions of the dies, particularly complexly shaped dies, receive more particulate material than other regions. The resultant parts are therefore irregular in density, subject to failure, and as a result, of questionable commercial use.

Traditional volumetric powder feed methods are further hindered by the inability to control the weight of material delivered into the die making it impossible to provide uniform weight from part to part. Hence, this further limits the uses for parts made by powder metallurgy.

Typically, as a solution to the problem of irregular powder density in the die cavity, when using a powder such as for example, aluminum powder, shaking or vibrating the feed hopper is employed for inducing flow of the particulate material and regularizing the density of the powder in the die. This is, however, time consuming, inaccurate, and not adequate to achieve sufficiently uniform density from part to part and throughout the part itself.

As a further disadvantage, shaking fine powders dislodges "fines" and dust from the powder which are then air borne to coat and contaminate the surrounding environs. Many of the powdered materials used in powder metallurgy to make parts are frequently quite costly and in some cases toxic. Airborne aluminum powders are also quite explosive. Hence, the dust problem can represent a considerable economic loss or health and safety hazard. Consequently, relatively elaborate and costly dust recovery systems and personnel safety precautions, such as filtered masks are presently used.

U.S. Pat. No. 3,697,208 to Munk et al. is directed to an apparatus for filling molds with comminuted fibrous materials by blowing the material into the mold. The air used to blow the material into the mold escapes out of a perforated plate or screen placed on top of the mold for preventing the loss of material from the mold during the blowing step. This apparatus is however, unsuitable for delivering all types of particulate material into a mold, especially metals which tend to be heavier and would therefore not move in the open system described in Munk et al. The Munk et al. process works like a sand-blaster to draw powder into an air stream that precedes the powder supply. The air to powder ratios are large and the time to fill is small. Moreover, uniform density of pressed powder parts could not be satisfactorily obtained because of the powders that fly up toward the perforated plate or screen during delivery. The requirement of a screen also makes it impossible to make parts that do not have flat top surfaces.

U.S. Pat. No. 4,813,818 to Sanzone discloses a feed shoe having a hopper for receiving powder materials from a source that communicates through a feeder tube with an enclosed filling chamber. The filling chamber is equipped with a vacuum. The vacuum is applied to assist the gravity flow of the powders through the feeder tube into the filling chamber. Such evacuation of the chamber does not however provide for the strict uniformity of density that is necessary to produce articles such as materials for thermal management applications, articles having tight dimensional control, etc. In thermal management materials strict uniformity of properties (i.e., coefficient of thermal expansion, thermal conductivity, etc.) throughout the article and from article to article is required. The Sanzone evacuation also does not provide for delivery of precisely controlled weights of powder to the die cavity. Further, using Sanzone, the driving force on the powders can never exceed atmosphere.

In addition, there presently exists technology for controlling and moving mechanical parts of die presses at much faster rates than are presently being used. The rate at which die presses can produce articles is limited by the rate at which the die cavity can be filled with particulate materials. This rate is relatively slow using known methods for delivering particles and feed shoes which use gravity to feed powders into the die cavity. Hence, known methods do not therefore allow the die presses to reach their maximum capacity for producing parts. The rate of production for the die presses is even slower using vibratory methods to induce more regular powder flow.

Moreover, in some instances there is an additional loss of time involved in shuttling the feed shoe back and forth from the die cavity to a retracted position in order to avoid the upper punch of the die press during the press cycle or "stroke." The stroke time is also lengthened by the requirement to allow sufficient time to raise the upper punch high enough to allow the feed shoe to pass thereunder en route to a retracted position.

In the aforementioned and other known methods and feed shoes for delivering particulate material to a die cavity, the step of retracting the feed shoe by dragging the feed shoe over the upper surface of the wear plate of the die table has been necessary to cut off the flow of particulate materials from the feed shoe. This retraction of the feed shoe after filling the die cavity results, however, in the buildup of powders in the die near the trailing edge of the feed shoe. This friction induced "wedging" effect further exacerbates the problem of obtaining parts and articles having non-uniform density upon compacting the particulate material in the die cavity, with all of the accompanying aforementioned disadvantages.

SUMMARY OF THE INVENTION

The present invention solves these aforementioned and other problems by providing a powder feeding system and powder delivery method that uses pressure or air to feed powder into a die cavity, thereby avoiding the problems inherent in gravity feed systems. Using pressure or air in the present powder feeding system and delivery method pushes a mass of powder well into the die cavity at a relatively rapid rate and subsequent pulsing serves to level the powder within the cavity.

The present invention further provides for a method and accompanying suitable apparatus for evenly and uniformly distributing particulate material throughout all regions of a die cavity by operating to fluidize the particulate material once it is situated inside the cavity. The resultant uniformity in material distribution throughout all regions of the die cavity is both in quantity and in density. Moreover, fluidization of the powder within the die cavity prior to compaction on the die press allows uniform filling of dies including those having complex geometries and those for producing multilevel parts. Additionally, such fluidization of the particulate material can also be used to thoroughly mix powders of different materials (and densities) to create a homogeneous mixture of powders in the die.

It should be understood that the use of the terms "powders" and "particulate", or "particulate material", are interchangeable for purposes of the description herein and should be construed to include any material that is particulate in nature and should not be limited solely to powdered metals.

The present invention also solves the problem of delivering a constant quantity by weight of particulate material to the die cavity from press cycle to press cycle (pressed part to pressed part) by providing a gravimetric feeding system and a method for delivering particulate material. For purposes of this invention "predetermined" is used to designate that weight of powder which is to be delivered to the die cavity of a powder press in order to produce a part of a given desired weight. It should be understood that such weight will vary accordingly from application to application (part to part) and therefore for purposes of this invention cannot be definitively quantified.

Hence, complex part shapes and parts having tight dimensional tolerances such as helical gears and sprockets heretofore unavailable using known powder delivery methods can be made in the die cavity of a powder press by using the present powder delivery methods and apparatus. In addition to providing such "as pressed" dimensional tolerances, the present invention provides an expanded applicability to part designs for powder metallurgy, better part yields as a result of fewer cracks in green compacts and sintered parts, faster set up times, and faster production rates.

The present invention also optionally allows for a shuttleless feeding system and method for powder delivery. Since particulate material is delivered directly to the die cavity using pressure or air there is no loss of time associated with extending and retracting a feed shoe vessel for delivering (shuttling) powders to the die cavity of a powder press. The absence of a shuttle, also eliminates any wedging of powders caused by dragging known feed shoe vessels back over the die cavity to sit in a retracted position. As a further advantage, the present invention can optionally be used as a completely closed system and thus also reduces or eliminates powder waste and environmental hazards from powders lost around die cavities using traditional feeding methods and apparatuses. Additionally, since moving shuttle parts are not required, there can be less overall parts to break or wear out thereby lowering costs. The safety issue of having a possible obstruction to the upper punch is also eliminated. The present invention also solves the aforementioned and other problems by providing a feed shoe that feeds particulate material into a die cavity at supra-atmospheric pressure to obtain a density that is uniform and greater than the bulk density of the particulate material. The fill ratio of a typical powder such as for example copper coated aluminum using the present invention pressurized feed shoe is reduced from 3:1 to about 2.3:1. The present invention feed shoe also allows the delivery of the particulate material to be controlled so that a density gradient is created within the particulate material in the die cavity. Compacted articles of graded density can thereby be produced.

The present invention also solves the problem of friction induced density irregularities (wedging) in the compacted articles by providing an apparatus that moves the feed shoe body forward in a horizontal plane that is above and transverse to the die cavity. The feed shoe body is moved to a position whereby the egress opening overhangs the die cavity. A device for downwardly moving the feed shoe body to register the egress opening with the die cavity is also provided.

The present invention further comprises a valve associated with the egress opening having a closed position for containing particulate material inside the feed shoe when the feed shoe body overhangs the table of the die press and an open position for delivering particulate material to the die cavity when the egress opening registers with the die cavity. This valve is "dripless" (i.e., it does not permit any particulate material to drip out when it is in the closed position) and is so constructed to resist particle induced jamming or clogging. By providing this valve associated with the egress opening of the feed shoe, the feed shoe can be raised above the die cavity to prevent friction induced wedging in the particulate material.

The present invention also provides a process for controlling the delivery of particulate material to a die cavity for producing articles of uniform density or gradient density from particulate material(s) and of different types and different inherent densities. The process involves a pre-compaction step for delivering the particulate material to a die cavity to produce a uniform density of the particulate material therein. The particulate material in the die cavity is then compacted to form an article having uniform density.

The present invention further provides a process for producing articles of a uniform density, which includes delivering particulate material to a die cavity, generating supra-atmospheric pressure within the die cavity, and compacting the particulate material to form an article having uniform density. A process for producing articles having a density gradient is also provided. In such a process, the powder delivery step is accomplished by varying the supra-atmospheric pressure within the die cavity.

DETAILED DESCRIPTION OF PREFERRED EMBODIMENTS

In its most basic embodiment, the present invention is directed to a method and accompanying apparatus for using pressure or air to push a mass of powder from behind into to a die cavity of a powder press and subsequently fluidizing the powder in the die cavity to provide for a substantially uniform density distribution of powder within the die cavity. Such fluidization can be carried out independent of the pressurized delivery. In other words, powder or particulate material that has been delivered to the die cavity of a powder press (or any other apparatus for making parts or components using particulate material) using conventional methods can also benefit from subsequent fluidization once inside the cavity using the present invention.

Figure 1:
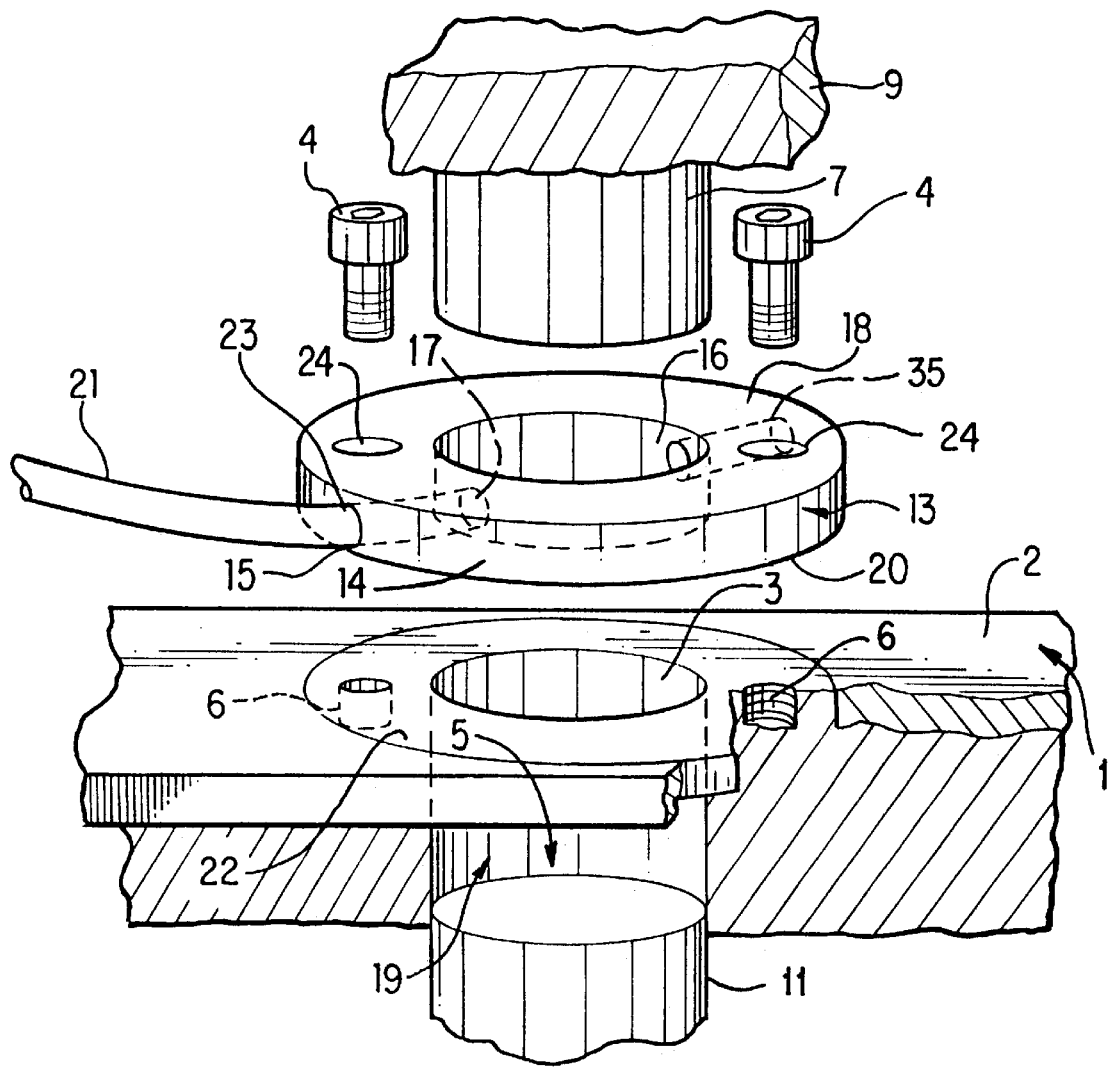
FIG. 1 is an exploded view of a powder feed system according to one embodiment of this invention.

Referring now to the embodiment illustrated in FIG. 1, the salient features of a gravimetric pulsed feed powder delivery system are shown. The feeding system as shown relates to the feeding and delivery of a precise amount of powdered metals into a die cavity. The powdered metals (not shown) are uniformly delivered using pressure from behind to push a mass of powder into all regions of die cavity 5 and are to be compacted by the simultaneous application of upper die punch 7 and lower die punch 11. Metal powders are being used for illustrative purposes only and the teachings of this invention, should not therefore be construed as being limited to handling of metal powders, but are equally applicable to the handling and delivery of particulate materials of various weights and types including without limitation, for example, flakes, powders, fibers or sheets of ceramics, polymers, carbides and cements (cementatious materials blended with water).

The present invention can push 500 grams of powder into a die in as little as three seconds or less. The overall cycle time for producing a part is consequently reduced from around 10 seconds using conventional powder feed methods to 4 seconds or less using the present methods and system. Concentricity and height and weight tolerances of such parts are also greatly increased.

Specifically, the invention as shown is directed to a powder feed system for delivering a quantity of particulate material to a die cavity of a powder press, such as the powder feed system exemplified by FIG. 1, reference to which is now made. The powder press includes platen 1 having table-like surface 2 which is flush with and surrounds die cavity 5. The press additionally includes upper punch 7, which appends from upper ram 9 and lower punch 11. The powder delivery system as shown is FIG. 1 comprises receptacle 13, shown here as annular in shape, for receiving and delivering particulate material to die cavity 5. Receptacle 13 is connected to die surface 22 by any suitable connector, such as those illustrated as bolts 4 which extend through receptacle holes 24 and then through threaded holes 6 in die surface 22. Receptacle 13 has ingress 15 through which a mass of particulate material is received under pressure and egress 17 that registers and communicates with interior 19 of cavity 5 and through which particulate material is pushed under pressure from feed conduit 21 through interior void 16 into cavity 5. Feed conduit 21 is sealingly attached at first end 23 to receptacle ingress 15.

In FIG. 1, the pressurized powder feed system according to the present invention is shown to have annular shaped receptacle 13 and comprises an annular receptacle body 14 that surrounds and defines interior void 16. Receptacle body 14 has top side 18 and bottom side 20 and is sealingly attached at bottom side 20 to die surface 22, die surface 22 being contiguous with table-like surface 2 of platen 1 so that annular receptacle body 14 surrounds upper rim 3 of die cavity 5 and interior void 16 is contiguous with cavity 5. Exhaust portal 35 extends through receptacle body 14 for releasing pressure from within interior 19 of die cavity 5.

Figure 2A:
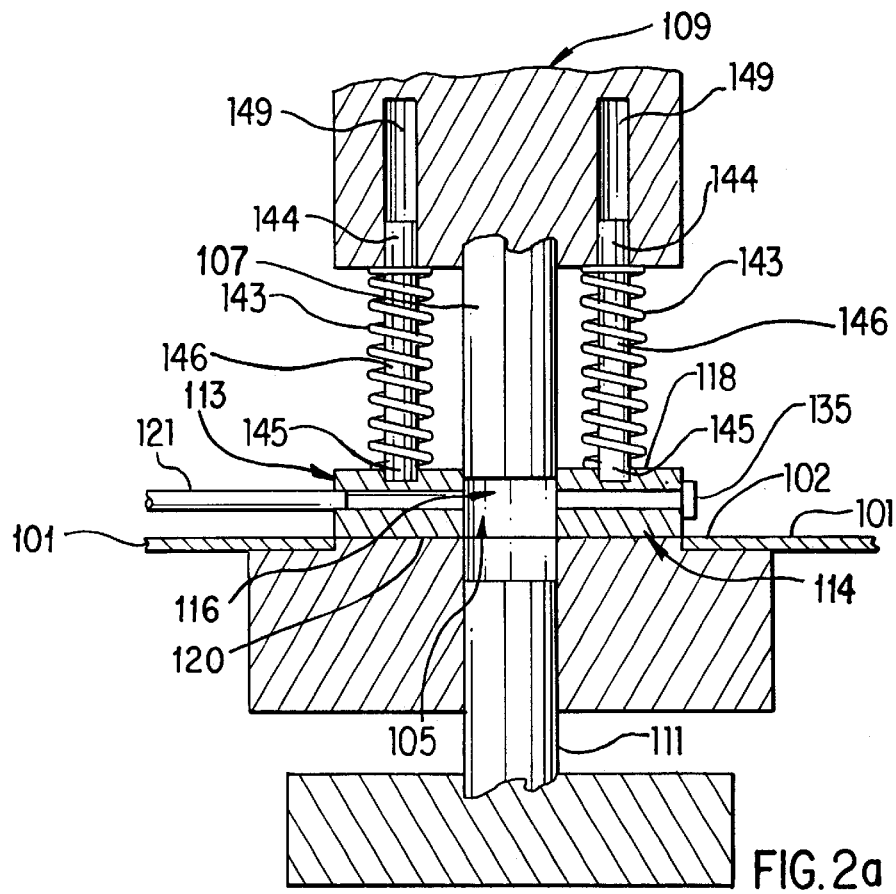
FIG. 2a is a schematic side view of an embodiment of the powder feed system in accordance with the present invention in the feed (engaged) position.
Figure 2B:
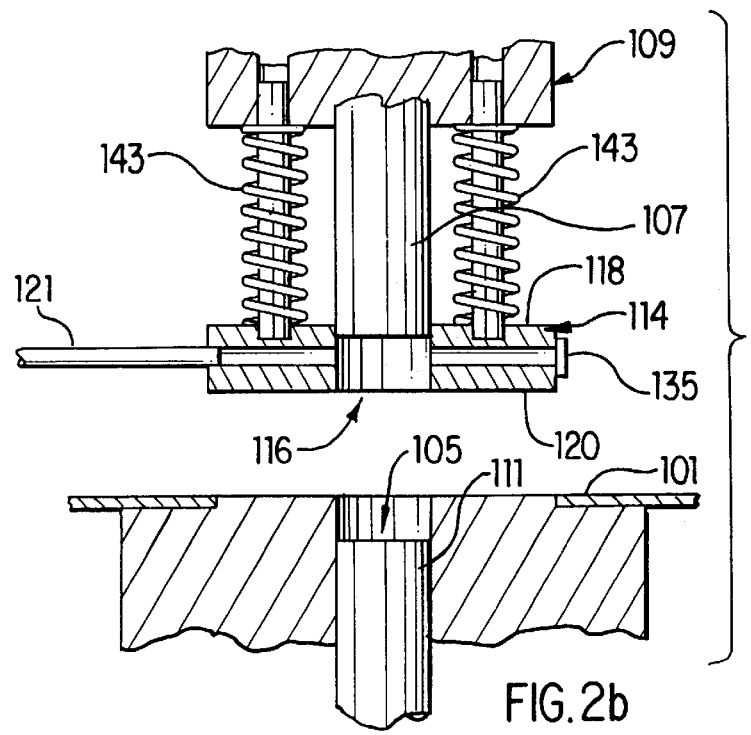
FIG. 2b shows the feed system of 2a in the resting (disengaged) position.

FIGS. 2a and 2b illustrate an alternative embodiment of the present pressurized powder feed system wherein receptacle 113 is annular in shape and comprises annular receptacle body 114 that surrounds and defines interior void 116 through which upper punch 107 passes. Exhaust portal 135 extends through receptacle body 114. Receptacle body 114 has bottom surface 120 for sealingly engaging die surface 122 surrounded by platen 101 (shown in engaged position in FIG. 2a) and top surface 118 at which it is movingly attached to and suspended from upper ram 109 by spring-like suspenders 143 through which pass anchoring posts 146 which are secured at first end 145 to receptacle body 114 and which slidably extend at second end 144 into recesses 149 of upper ram 109. In operation, upper ram 109 moves downwardly, lowering annular-like receptacle body 114 to a position whereby bottom surface 120 of receptacle body 114 engages top surface 122 of die cavity 105. Upper ram 109 continues in a downward fashion lowering upper punch 107 through interior void 116, thereby sealing interior void 116 before continuing down into die cavity 105 and pressing particulate material (pushed into to die cavity 105 through feed conduit 121) against lower punch 111.

In an alternative embodiment, although not specifically illustrated herein, the receptacle body can form part of the die and sit "in" the cavity whereby the top of the receptacle body is flush with the surface of the platen. In such an embodiment, the powder feed system according to the present invention comprises an annular (or other suitable shaped) receptacle body that surrounds and defines the die cavity. The receptacle body has a top and a bottom side and is situated so that the top side of the receptacle body is flush with the table-like surface of the platen. Such a configuration is useful in situations where the powder press ejects parts by lowering the platen relative to a stationary lower punch to push the part up and out from the die cavity. As can be envisioned by one of skill in the art, in embodiments of the present invention wherein the feeding receptacle is bolted to the top of the platen, parts may become entrapped within the interior void of the receptacle upon ejection.

In all of the aforementioned embodiments, it is to be understood that the "annular" shape of the receptacle is for exemplary purposes only and that the receptacle can be any shape that appropriately surrounds the die cavity and that has an interior that defines the shape of the die cavity by more or less following the shape of the rim of the cavity. Hence, the present invention should not be construed to be limited to annular-shaped receptacles.

In specific instances, the receptacle can be the upper punch or the lower punch of the die press. Such a configuration is especially well suited to situations where very small parts are being fabricated. In such instances the punch integrity is not diminished or compromised by the loss of punch mass necessary to convert it into a receptacle through which powder is delivered.

In yet another alternative embodiment (not shown), the receptacle is box-like in shape and the ingress is a top ingress and the egress is a bottom egress. The box-like receptacle is optionally organized to cooperate with a shuttle such as pneumatic piston/cylinder or mechanical linkage for selectively reciprocating the receptacle along a horizontal plane elevated above and transverse to a position whereby its bottom egress overhangs the die cavity and for downwardly moving the receptacle to register its bottom opening with the die cavity. The powder in the receptacle is then pushed into the die cavity using pressure or air. The box-like receptacle is then shuttled away to allow for the upper punch to lower into the die cavity and press the part.

Figure 3:
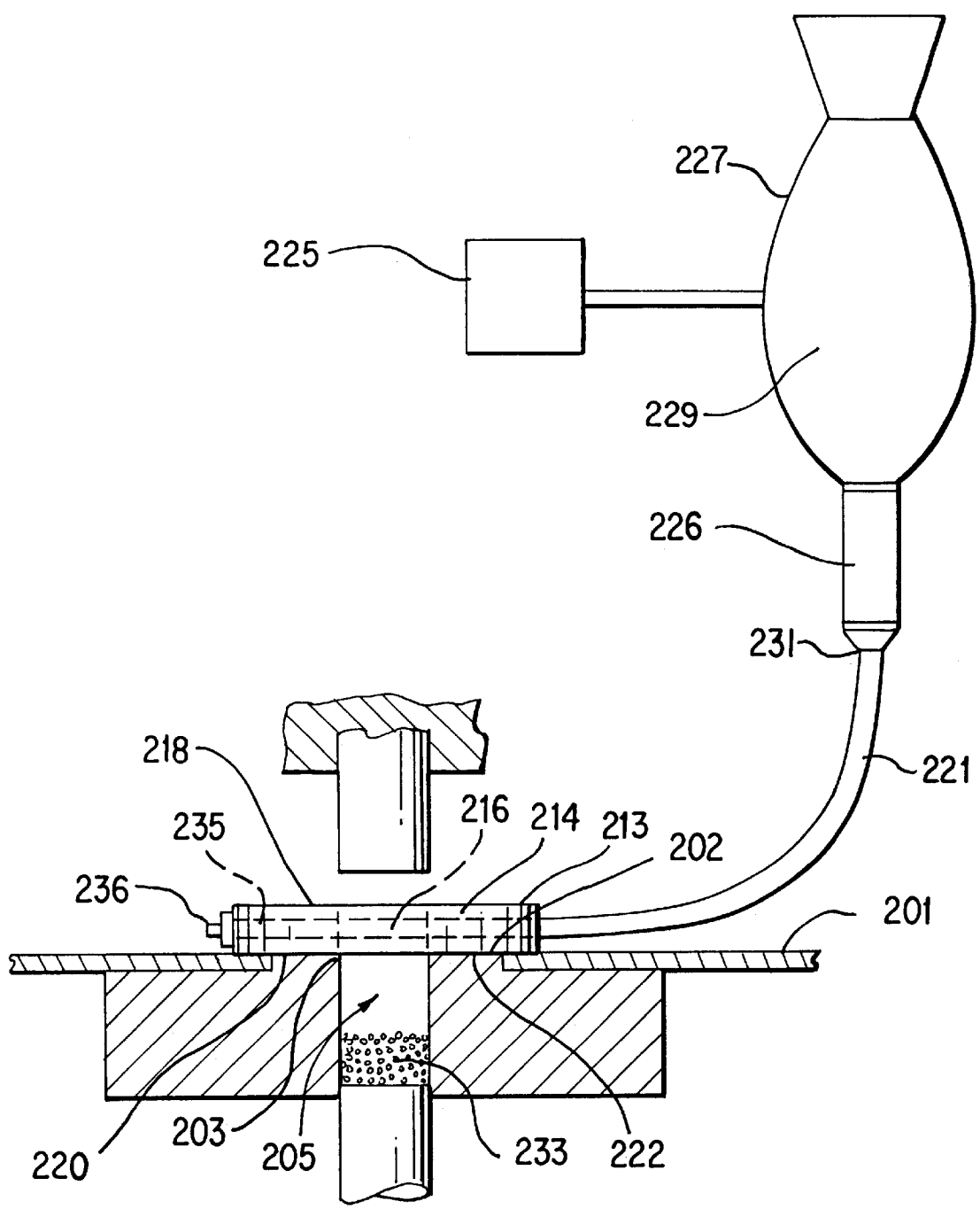
FIG. 3 is schematic side view of a powder delivery system showing the pressure vessel and feed conduit.

Referring now to FIG. 3, the present invention is further illustrated wherein at least one pressure generator 225 is sealingly attached to and openly communicating with top end 227 of pressure vessel 229. Pressure vessel 229 is attached at its bottom end 226 to second end 231 of feed conduit 221. Pressure generator 225 is for providing supra atmospheric pressure to push particulate material from vessel 229 through feed conduit 221 into die cavity 205 and for optionally fluidizing particulate material 233 within die cavity 205 to create a substantially uniform density distribution of the particulate material 233 within cavity 205. Feed conduit 221 is preferably made from a material which does not generate static electricity. The present inventors have found that a tube of conductive teflon material with graphite flakes dispersed therein situated inside of a stainless steel sleeve for grounding purposes to be useful. However, any non-static material is suitable for use as the feed conduit. A least one exhaust portal 235 extends through receptacle body 214 for releasing pressure from within die cavity 205. Receptacle body 214 is shown here to surround and define interior void 216 Receptacle body 214 has top side 218 and bottom side 220 and is sealingly attached at bottom side 220 to die surface 222 surrounded by platen 201 so that annular receptacle body 214 surrounds upper rim 203 of die cavity 205 and interior void 216 is contiguous with cavity 205.

At least one exhaust portal is provided at any suitable point in the powder delivery system of the present invention. For example, as shown in FIG. 3, at least one exhaust portal 235 can be situated on receptacle 213 wherein it extends through receptacle body 214, or alternatively, at least one exhaust portal can be situated on pressure vessel 229 or on both. Exhaust portal 235 allows for the release of pressure from within die cavity 205 as pressure is used to push the powder into the cavity 205 and can also be used in conjunction with pulses of pressure to fluidize the powders within die cavity 205. Exhaust portal 235 is further equipped with a valve 236, such as a poppit valve, for opening and closing to relieve pressure within die cavity 205.

Figure 4:
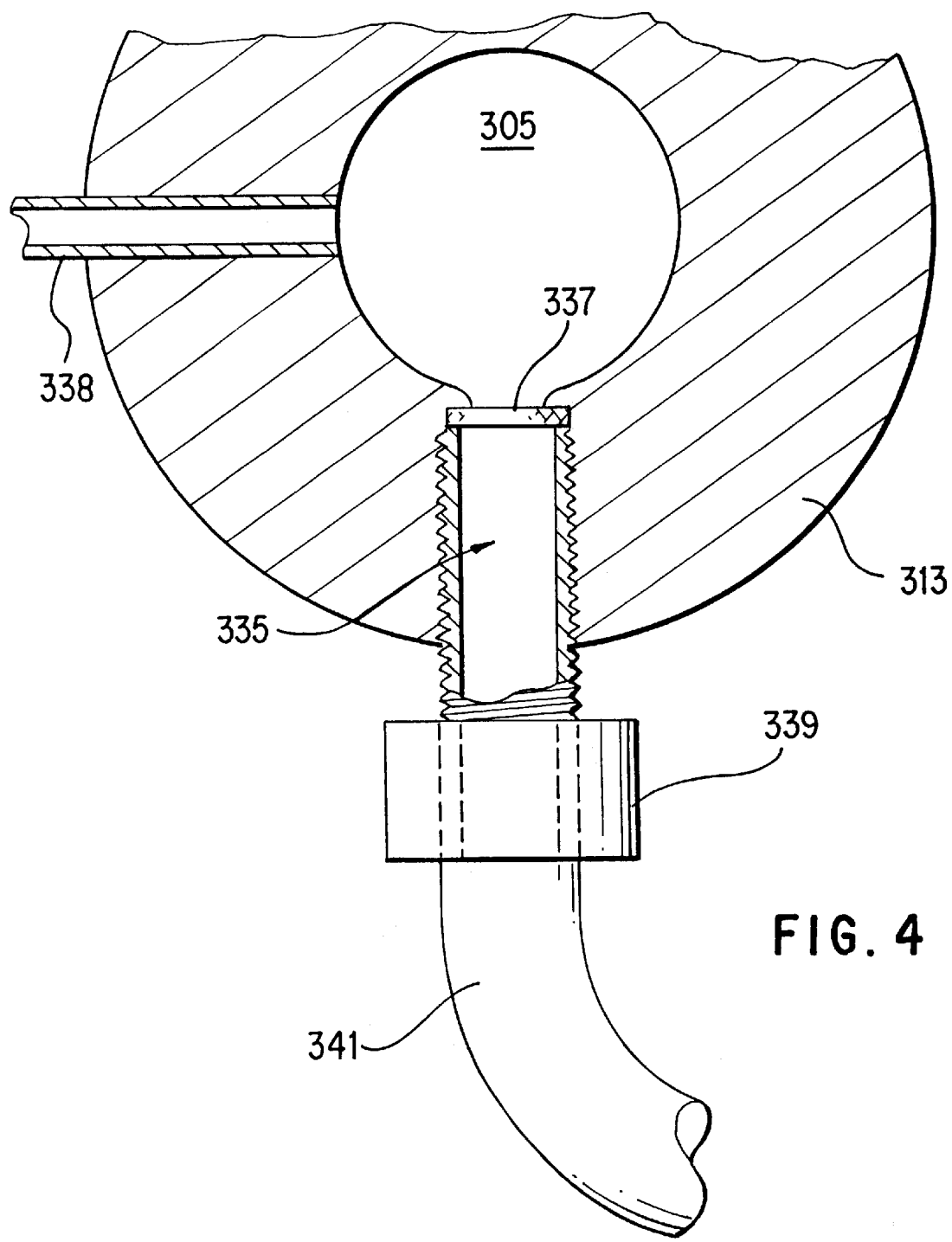
FIG. 4 is top detail of an annular shaped feed receptacle used in the powder feed system according to the present invention showing the back pressure filter cleaning system.

Referring now to FIG. 4, exhaust portal 335 is additionally optionally equipped with screen 337 situated at its proximal side to prevent the escape of powders from die cavity 305 through portal 335 during pressure delivery through the powder delivery conduit (not shown) into die cavity 305. Exhaust portal 335 is optionally further equipped at its distal end with an auxiliary pressure generator (not shown) for pushing powders off of screen 337 to clean it. A third optional conduit, auxiliary conduit 338 is provided in receptacle 313 to deliver any number of useful additive substances to the interior of die cavity 305. Such additives include, for example, solvents, reactants die wall lubricants, activation solutions (dilute acids for cold welding of powders), and any other of a number of substances useful in the production of parts and components using a powder press.

As described, the aforementioned feeding system may be gravimetric and thus optionally further comprise a scale (or scales for multiple weighing) juxtaposed between the feed system receptacle and a source of particulate material. The scale is used to weigh the quantity of particulate material before it is delivered to the die cavity. The present gravimetric delivery method and feeding system is capable of providing an individual shot of powder, up to about 3000 or more grams to be pre-weighed to an accuracy of within about 0.1 grams. The powder shot is optionally weighed and pushed from behind under pressure into a die cavity, and fluidized once inside the die cavity (caused to behave fluid-like in nature), thereby uniformly filling all regions in the cavity to uniform density.

Figure 5:
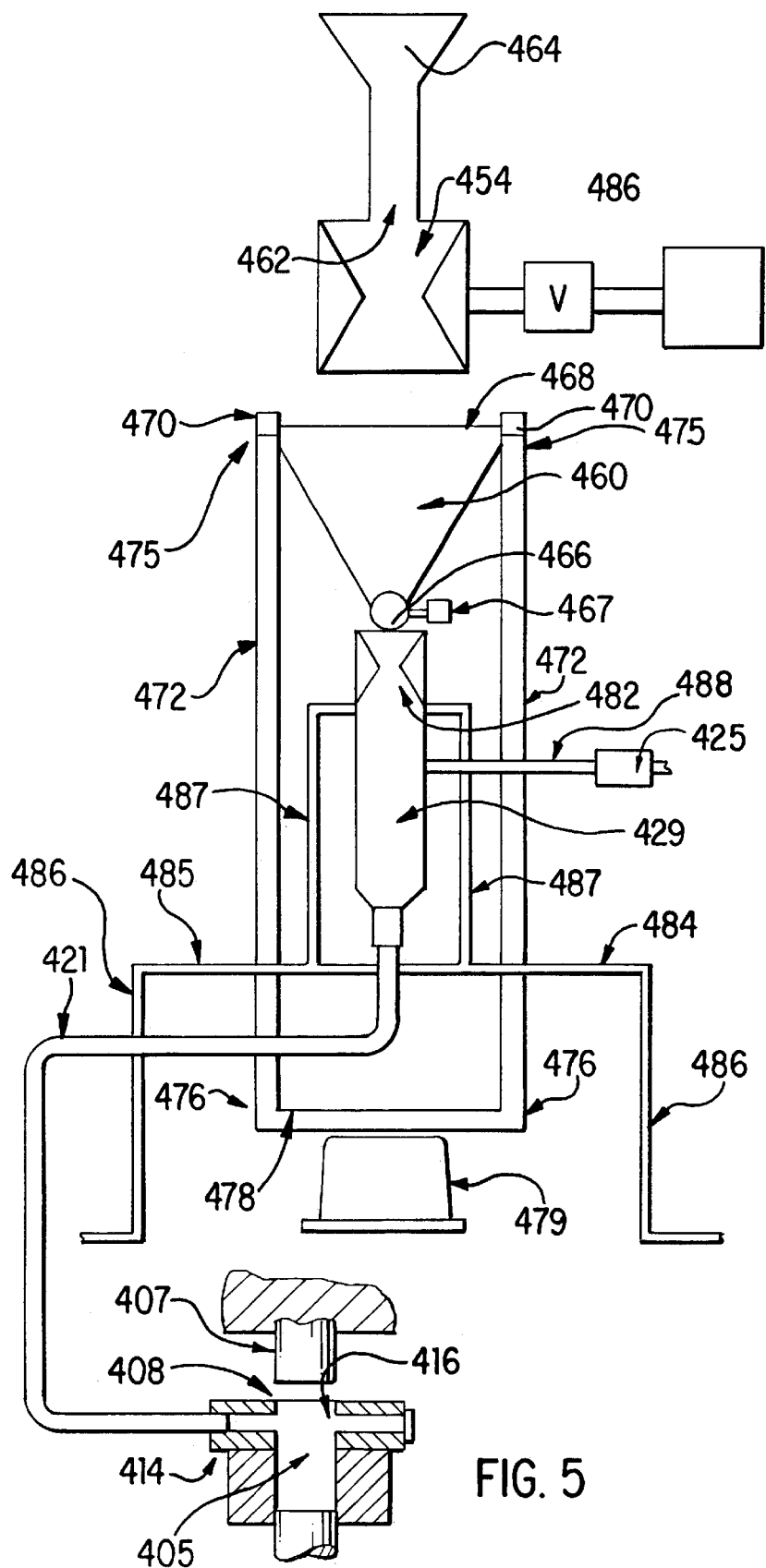
FIG. 5 is a schematic view of an embodiment of the present powder feed system including a scale.

Referring now to FIG. 5, a scale according to the present invention is comprised of scale vessel 460 for receiving a quantity of particulate material (not shown) from lower end 462 of hopper 464. Scale vessel 460 is receptive of the quantity of particulate material. Scale vessel 460 has at least one bottom egress opening 466 for releasing the particulate material into pressure vessel 429. Scale vessel 460 has upper edge 468 with at least two support points 470 situated thereon. Elongated support beams 472 suspend from and attach at proximal end 475 to each of said at least two support points 470 and attached at its distal end 476 to crossbar 478. Crossbar 478 rests upon load cell 479. Load cell 479 has a signal sender (not shown) for sending signals to a controller (not shown) for opening and closing valve 480 associated with discharge opening 462 of hopper 464. Pressure vessel 429 has valve 482 associated therewith for preventing the escape of pressure therefrom when pressure vessel 429 is receptive of pressure provided by pressure generator 425. Pressure vessel 429 is supported above and offset from load cell 479 by bridging member 484. Bridging member 484 is comprised of horizontal bridge support 485 and vertical bridge supports 486, each of which straddles load cell 479. Pressure vessel 429 is suspended above horizontal bridge support 485 by vessel suspenders 487. Pressure generator 425 is for generating supra-atmospheric pressures within vessel 429, feed conduit 421 and die cavity 405 and is connected to pressure vessel 429 via pressure duct 488 and to an electronic controller (not shown) responsible for starting and stopping the delivery of pressure to vessel 429.

It is important to note that the weighing system according to the present invention acts independently of the pressure delivery system and accordingly does not provide an overall time disadvantage to the system. Hence, appropriate amounts of powdered materials are weighed during the press cycle and are therefore immediately ready to be utilized once the contents of the pressurized feed system receptacle is delivered to the die cavity.

As further shown in FIG. 5, the pressurized feed system generally comprises feed system receptacle body 414 through which a quantity of particulate material (not shown) is pushed into die cavity 405 and powder feed conduit 421 for communicating with receptacle body 414. Additionally, several pressure systems can be used in concert to deliver different materials such as copper aluminum to make a heat sink with a copper aluminum base for low coefficient of thermal conductivity or a multiplicity of alloys of different compositions to make functionally graded alloys.

In operation, feed receptacle body 414 is situated so that interior void 416 registers with and is contiguous with die cavity 405. Upper punch 407 is lowered to a position whereby it engages the inner periphery 408 of receptacle body 414 and seals die cavity 405 from the outside atmosphere allowing for pressurizing of the system. Hopper valve 454 opens and allows particulate material from hopper 464 to flow into scale vessel 460 having closed (flapper) valve 467. When load cell 479 registers the weight of the particulate material inside scale vessel 460 as about one half that of a predetermined weight, a signal is sent from load cell 479 to partially close hopper valve 454 thereby slowing the rate of flow of particulate material from hopper 464 into scale vessel 460. When load cell 479 registers the weight of the particulate material inside scale vessel 460 as the predetermined weight, valve 454 completely closes thereby stopping the flow of particulate material from hopper 464 into scale vessel 460. Valve 467 opens to release the particulate material into pressure vessel 429. Valve 482 closes and pressure generator 425 generates pressure within pressure vessel 429, thereby pushing the particulate material through powder feed conduit 421 into interior void 416 of receptacle body 414 and into die cavity 405. Pressure is exhausted through exhaust portal 435 (or through auxiliary exhaust portal not shown) either simultaneously with pressure generated pushing of particulate material or shortly thereafter. Pressure generated is subsequently exhausted in a series of at least one pulse to fluidize the particulate material within die cavity 405 and evenly distribute the powder to uniform density within all regions of die cavity 405. Upper punch 407 continues in a downward motion and the particulate material is compressed within die cavity 405 to produce a part (not shown). The cycle is repeated for each part to be produced.

Figure 13:
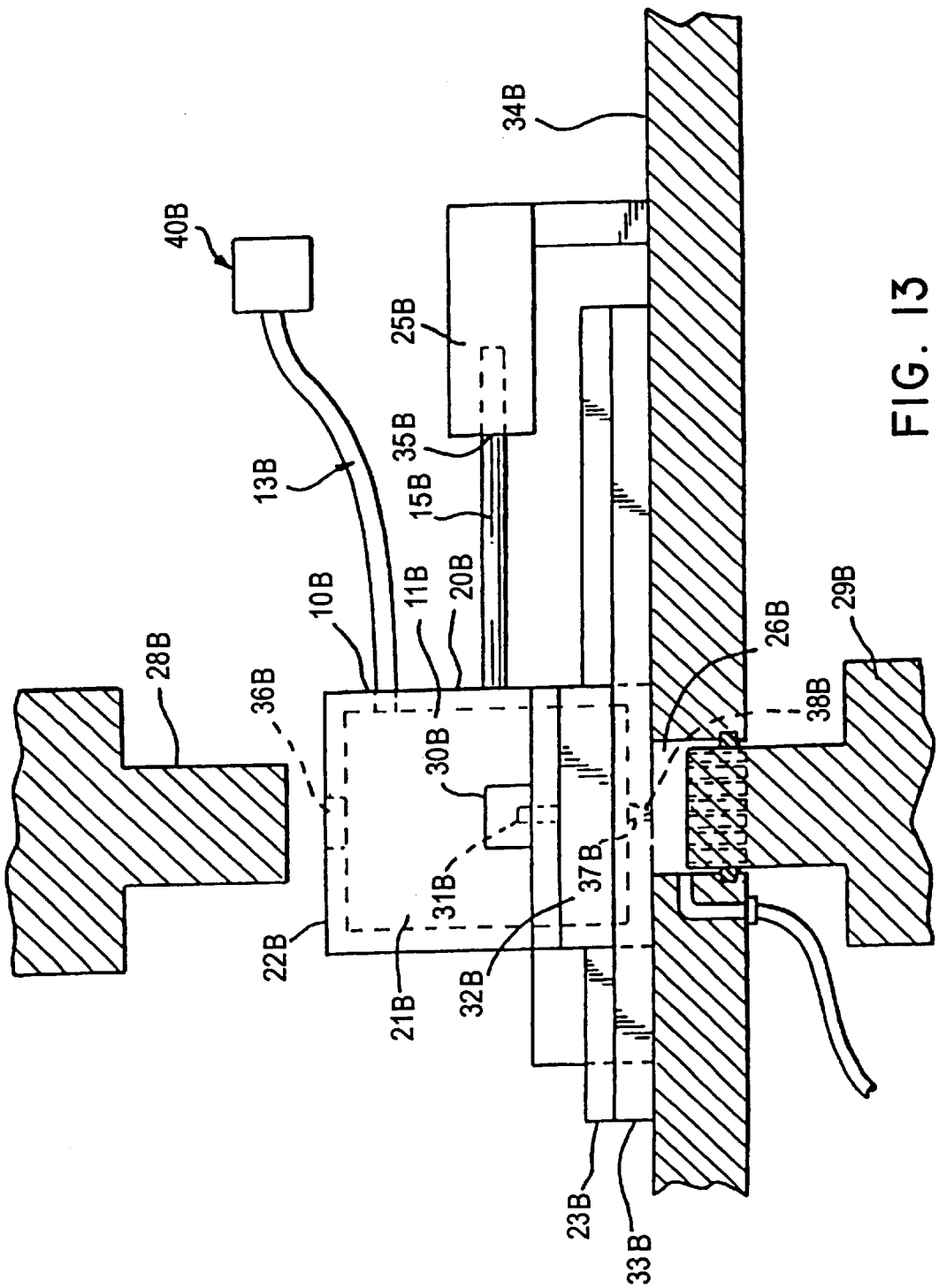
FIG. 13 is a side elevation of a feed shoe according to one embodiment of this invention.

Referring now to the embodiment illustrated in FIG. 13, the features of a preferred feed shoe 10B are shown. Feed shoe 10B as shown relates to the feeding and delivery of powdered metals into die cavity 26B, the powdered metals being compacted by upper and lower punches 28B and 29B. The teachings of this invention, however, are not limited to the handling of metal powders, but are equally applicable to the handling of particulate materials of various weights and types including, for example, ceramics, polymers, carbides, or cements (cementatious materials blended with water).

As shown in FIG. 13, pressurized feed shoe 10B generally comprises feed shoe vessel 10B, and pressure conduit 13B communicating with vessel 11B through air ingress 14B. A pressure generator 40B for generating supra-atmospheric pressures within vessel 11B and die cavity 26B for delivering powder material into die cavity 26B with a uniform density which is greater than the bulk density of the powder material communicates with vessel 11B via pressure conduit 13B sealingly engaged thereto. Alternatively, the pressure generator can be used to vary the density of the powder material in the die cavity along a gradient by varying the pressure generated during powder delivery. Feed shoe 10B is organized to cooperate with pneumatic piston 15B and actuator cylinder 25B, or any other suitable mechanical linkage known to those in the art for selectively reciprocating the pressurized feed shoe such as cams, motors, gears, hydraulic pistons, stopping motors, linear motion transducers, servo motors, etc., as will appear more clearly in association with the operational description hereinafter. Delivery of the feed shoe 10B to and from the die cavity 26B can be in a linear or non-linear motion (i.e., swinging or pivoting back and forth) over the die cavity 26B.

Shoe vessel 11B is preferably constructed of any material, such as a metal or metal alloy, that is suitable for withstanding supra-atmospheric pressures and includes rear wall 20B having a pair of laterally spaced side walls 21B, 21C depending from a planar top wall 22B thereof. Powder ingress 36B is situated in planar top wall 22B and communicates with an optional hopper (not shown) receptive of a quantity of powder material. Powder ingress 36B is associated with an ingress valve (not shown) for maintaining pressure within shoe vessel 11B after and while it is pressurized. When present, the hopper has a discharge opening at the lower end thereof and communicates with the interior of vessel 11B through a filling conduit (not shown) which enters powder ingress 36B. One each of a pair of bridge member 23B extend from the bottom exterior of side walls 21B, 21C and have elevation cylinders 30B mounted thereon. Piston 31B is mounted at its bottom end to guide 32B and slidably engages the interior of elevation cylinder 30B. In operation, pressure is applied to elevation cylinder 30B and the pressure forces the spatial separation of piston 31B from elevation cylinder 30B thereby elevating bridge member 23B to lift feed shoe vessel 11B. Rail 33B is fixed to the wear plate of die table 34B, and guides 32B slide freely in a self-aligning linear motion along rails 33B, actuated by piston 15B sliding to through opening 35B inside actuator cylinder 25B that is fixed to the wear plate of die table 34B. In use, by applying a pressure to actuator cylinder 25B forcing the forward movement of piston 15B which is attached to feed shoe 10B, feed shoe 10B moves forward. Actuator cylinder 25B can be operationally joined to any source of reciprocating motion, so that pressurized feed shoe 10B may be translated linearly in operation to and from a die cavity for the production of powdered metal products. For that purpose, opening 35B is provided in actuator cylinder 25B to accept piston 15B.

Vessel 11B has bottom egress opening 37B. Valve 38B is associated with egress opening 37B and has a closed position for containing powder material inside vessel 11B and an open position for delivering powder material to die cavity 26B when egress opening 37B registers with die cavity 26B. In applications where it is necessary or desirable to deliver more than one type of particulate material to the die cavity, the feed shoe can have more than one egress opening 37B (not shown). Additionally, where it is desirable to deliver particulate material into very wide parts such as rings, gears etc., the feed shoe can have multiple egress openings (not shown).

Figure 14:
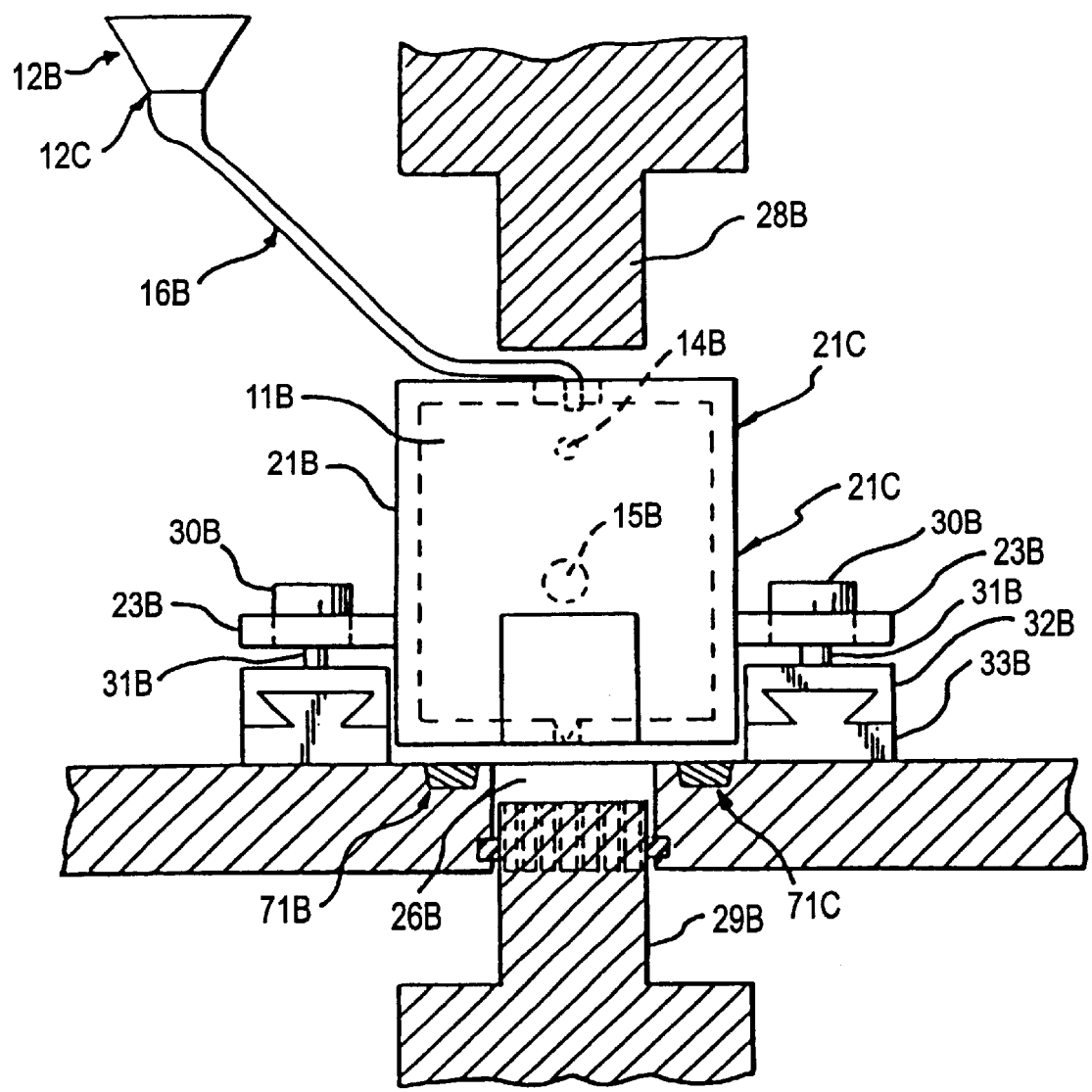
FIG. 14 is a front view of FIG. 13 showing the feed shoe in a horizontal plane elevated above and transverse to the die cavity.

FIG. 14 is a front view of FIG. 13 and shows the feed shoe 10B in an elevated position above and offset from the die cavity 26B. In this position, powder material is prevented from entering the die cavity 26B. As described with respect to FIG. 13, piston 31B is mounted to guide 32B and slidably engages the interior of elevation cylinder 30B. The elevation cylinder 30B is attached to bridge member 23B, which in turn is connected to the side walls 21B, 21C of the feed shoe vessel 11B. In FIG. 14, pressure has been applied to elevation cylinder 30B to force the separation of piston 31B from the elevation cylinder 30B in the upward direction indicated by the arrow. The upward movement of the elevation cylinder 30B in turn causes the bridge member 23B to lift in the same upward direction, thereby also raising the feed shoe vessel 11B. The feed shoe 10B is thereby spatially separated from the die cavity 26B.

Continuing with respect to FIG. 14, once the feed shoe 10B is in an elevated position, the feed shoe 10B moves transverse to the die cavity 26B. This movement is accomplished by applying a pressure to actuator cylinder 25B (see FIG. 13) to force the movement of piston 15B through the opening 35B in the actuator cylinder 25B. The movement of piston 15B causes guides 32B to slide along rails 33B, so that the feed shoe 10B is moved to its final position above and transverse to the die cavity.

Figure 15:
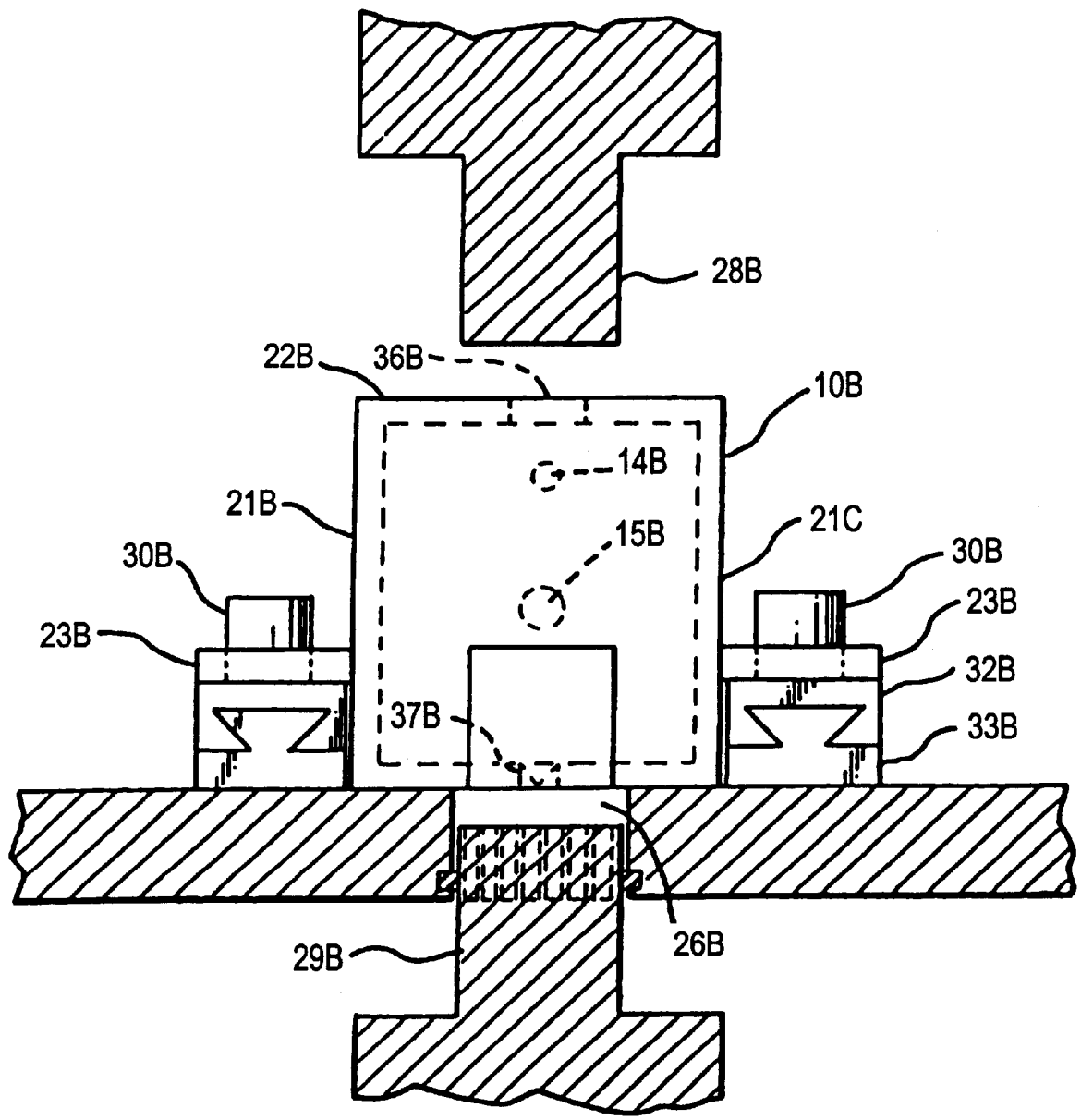
FIG. 15 is a front view of FIG. 13 showing the feed shoe in fill position.

When it is desired to fill the die cavity 26B with a powdered material, the movements described with respect to FIG. 14 are simply reversed. That is, an opposite pressure is applied to actuator cylinder 25B, such that piston 15B moves back out of the actuator cylinder 25B. The movement of piston 15B in the opposite direction causes guides 32B to slide back on rails 33B until the feed shoe 10B is positioned above the die cavity 26B. An opposite pressure is then applied to lower elevation cylinder 30B and force piston 31B back into the elevation cylinder 30B. Bridge member 23B is thereby lowered in accordance with the movement of elevation cylinder 30B, and accordingly, feed shoe vessel 11B also lowers and is locked in the lowered position until after pressurization of feed vessel 11B. The movement of feed shoe vessel 11B halts when egress opening 37B registers with die cavity 26B. The feed shoe 10B is then in position to transfer powdered material to the die cavity 26B. FIG. 15 shows the feed shoe 10B in the position for filling the die cavity 26B. A lock 71B, or 71C locking mechanism, as for example, a strong magnet, keeps the feed shoe registered with the die cavity during pressurized delivery of the particulate material therein. A hopper 12B containing particulate material has a discharge opening 12C. A filling conduit 16B passes through the ingress opening 36B and extends between the discharge opening 12C of the hopper 12B and the interior of the vessel 11B.

The step of fluidizing, for purposes of the present invention, serves to level the powder inside the die cavity so that it has a uniform density throughout the die cavity. This step of fluidizing the powder can be done independently of the pressurized powder delivery and thus can be used in traditional powder feed methods and feed shoes wherein a shuttle simply drops powder into a die cavity. For purposes of the present invention, fluidization can be carried out by any number of methods and can include, but should not be construed as limited to, pressurizing and exhausting the die cavity, agitating the filled cavity by vibration (ultrasonic, sonic, shock, electric field or magnetic pulses, etc.) or by adding the powder blended with a liquid component to the die cavity. Such liquid could be subsequently removed by evaporation, suction or forced out by pressure.

The present invention is further directed to a method for creating uniform density distribution of a quantity of particulate material situated within a die cavity of a powder press. The method comprises delivering a quantity of particulate material to the die cavity and fluidizing the particulate material within the die cavity to evenly distribute the particulate material so that it is substantially uniform in density throughout the die cavity. Preferably the fluidizing step comprises sealing the die cavity from the atmosphere and thereafter applying a series of at least one pressure pulse into the interior of the die cavity. The series of pressure pulses comprises from about 2 to about 100 pressure pulses, each of which comprises delivering supra-atmospheric pressure into the sealed die cavity and thereafter exhausting the pressure from within the die cavity. Preferably each of the pressure pulses comprise delivering pressure to the die cavity in the amount of about 1 pound per square inch ("psi") to about 150 psi, for a time period of about 10× seconds and exhausting the pressure at least one time for a time period of from about x seconds. Typically, such pressure pulses comprises delivering pressure to the die cavity in the amount of about 1 psi to about 150 psi, for a time period of from about 0.01 seconds to about 60 seconds and exhausting the pressure at least one time for a time period of from about 0.01 seconds to about 60 seconds.

In a particularly preferred method the series of pressure pulses comprises from about 2 to about 100 pressure pulses. Each of the pressure pulses comprises delivering pressure to the die cavity in the amount of from about 1 psi to about 150 psi, for a time period of from about 0.01 seconds to about 60 seconds and exhausting the pressure at least one time for a time period of from about 0.01 seconds to about 60 seconds.

In the method according to the present invention, supra-atmospheric pressure is optionally applied simultaneously with the powder delivery step to push the particulate material into the die cavity. In such instances, the pressure applied during powder delivery is from about 1 psi to about 150 psi, and is applied for a time period of from about 0.01 seconds to about 60 seconds. In methods according to the present invention wherein pressure is also used to push the particulate material into the die cavity, the fluidizing step can alternatively comprise exhausting the pressure used to push the particulate material into the die cavity from the die cavity in a series of at least one pulsed exhaust. The series preferably comprises from about 2 to about 100 pulsed exhausts and each of the pulsed exhausts should preferably last from about 0.01 seconds to about 60 seconds.

In general, suitable specific pressures for generating within the die cavity when using the present method and powder feed system are readily optimizable and should not be construed to be limited only to those ranges specifically taught hereinabove. These pressures will generally vary depending on the size and complexity of the die cavity, and the degree of difficulty in uniformly filling the die cavity. Likewise, suitable time duration for pressurizing (and exhausting) are also readily optimizable by one of skill in the art. The aforementioned optimization is also applicable for creating an appropriate pattern of pulses for delivering and exhausting pressure to create a fluidized bed of powders within the die cavity and thereby resulting in uniform density distribution of powders therein prior to powder compression or for homogeneously mixing different powders (optionally having different respective densities) within the die cavity. The step of fluidizing the powder within the die cavity should not however be limited to generating and exhausting pressure within the cavity and should be construed to include other means for causing the particulate material within the die cavity to behave like a fluid and thus distribute to uniform density throughout the die cavity. Such other means can include, but are not limited to methods for agitating the filled die such as creating an electric field, ultrasonic and sonic vibration, mechanical vibration, magnetic field and combinations thereof. Alternatively, the step of fluidization can be carried out by blending the powder with a suitable liquid that would subsequently be removed by evaporation or by being forced or vacuumed out of the die. Uniform powder distribution within the die cavity can alternatively be accomplished by providing the powder to the die cavity in shrink wrapped sacks that are tightly stretched around the powder materials. Such sacks would also act to level the materials in the die upon compaction.

As in the powder feed system described hereinabove, particulate material suitable for use in the present method can be any known or as of yet unknown particulate, (e.g. particles, flakes, fibers or mixtures thereof) material used to fabricate parts or components. Examples of such suitable materials include, but should not be limited to metal powders, non-metal powders, intermetallic powders and composite powders.

The present invention method optionally comprises weighing the particulate material before delivering it to the interior of the die cavity. Such a method comprises providing a quantity of particulate material and allowing the particulate material to flow at a first rate into a weighing receptacle resting on a scale for registering the weight of the particulate material. The flow rate is reduced to a second rate when the scale registers a weight that is from about one quarter to about three quarters that of the predetermined weight, and preferably about one half that of the predetermined weight. The flow of particulate material is stopped when the scale registers the constant weight. The constant weight of particulate material is then delivered to a feeding receptacle that registers with the die cavity. The top of the die cavity is sealed with the upper punch. Simultaneously with the delivering step, pressure is generated within the pressure vessel and into the feeding receptacle to push the mass of particulate material from behind into the die cavity. Because pressure is generated and applied from behind, the particulate material travels in front of the pressurized air as a whole mass of material. Preferably, the quantity of particulate material is provided in a hopper having a valve associated with a lower portion thereof. The valve is opened to allow the particulate material to flow at a rate from the hopper into a weighing receptacle resting on a scale for registering the weight of the particulate material. The valve is partially closed when the scale registers a weight that is from about one quarter to about three quarters that of the constant weight and most preferably when the weight is about one half that of the constant weight. The valve is completely closed when the load cell registers the constant weight.

This method can, of course, also optionally include the step of fluidizing the particulate material within the die cavity to distribute the particulate material to uniform density throughout the die cavity. Such step of fluidization can be carried out using any of those methods described hereinabove.

As noted, the method according to the present invention is especially well suited to produce parts having complex shape and tight dimensional tolerances by powder metallurgy. In these methods the die cavity is provided in a shape corresponding to that of the part. Exemplary parts that can made using the present invention include but should not be limited to a watch bezel, a sprocket, a helical gear, a worm gear, a stator core, heat sinking structures, automobile connecting rods and an armature for an electrical motor.

Powder feed systems and methods according to the present invention can be adapted for use in any known powder press manufacturing process and can also be temperature controlled as appropriate by, for example, insulation, heating with convection or induction, microwave systems or heat transfer methods that pump oil or hot water through pipes or coils. The feed systems and methods described can also be used in multiple feed situations.

In yet a further embodiment, the present invention is directed to a powder press for making parts from particulate materials. The powder press according to the present invention comprises the above-described powder feed system for delivering particulate materials to a die cavity and a wear plate defining a die table of the powder press. In those embodiments of the present invention involving a shuttle, the shuttle of the feed system receptacle is mounted on its underside to an upper surface of the wear plate. In those embodiments that are shuttleless, an annular feed ring is attached to the upper surface of the die table or set inside and is flush with and surrounds the die cavity. Alternatively, the annular ring floats with and is suspended around the upper punch of the powder press.

The invention will now be described more specifically with reference to the following non-limiting examples thereof.

The present invention also provides a process for producing articles of uniform density from particulate material. The process comprises the steps of delivering particulate material to a die cavity, generating a supra-atmospheric pressure within the die cavity to produce a uniform density of the particulate material that is greater than the material's bulk density or generating a gradient of pressure used to deliver the particulate material to the die cavity with a gradient of densities, and compacting the particulate material to form an article having a uniform density. Additional steps may be utilized if it is desired or necessary to add liquid components to the particulate material. The process can further comprise repeating the pressurized delivery step with a second or third particulate material.

EXAMPLES

Example 1

Figure 6:
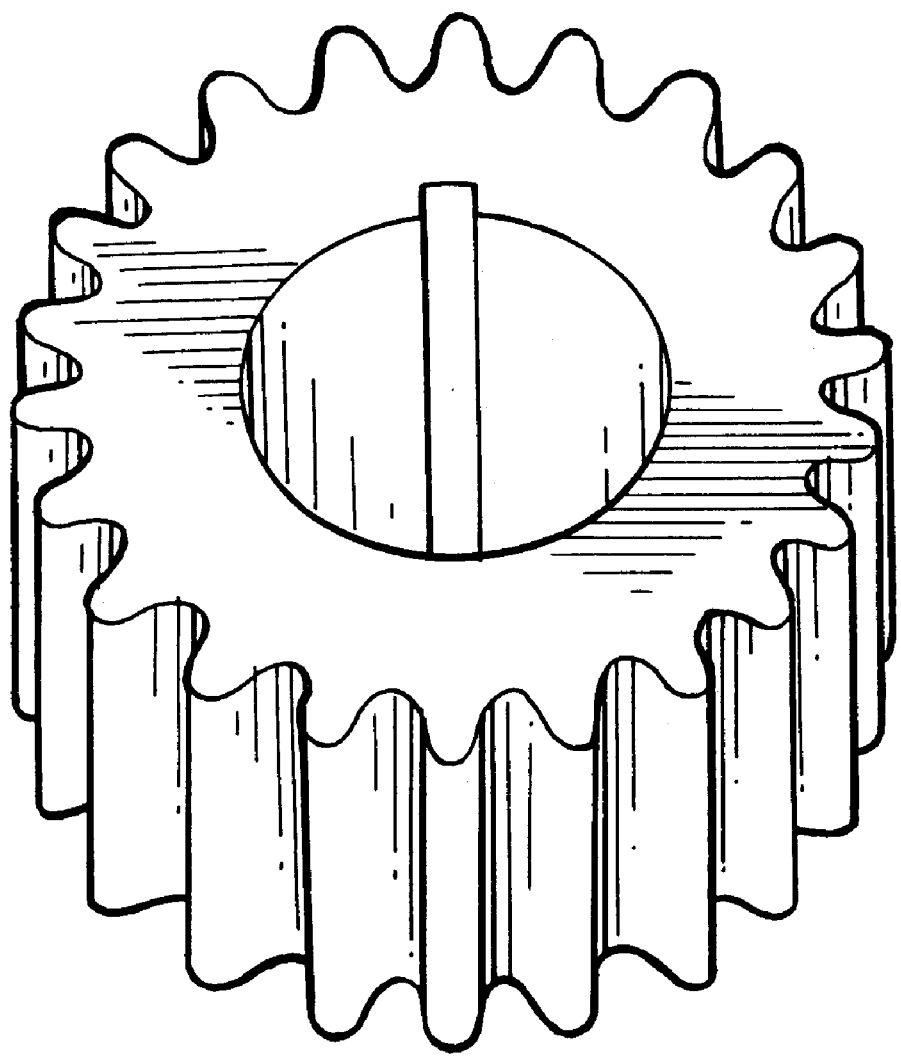
FIG. 6 is a perspective view of a sprocket made using the present invention.

A series of thirty, 500 gram sprocket parts having a shape similar to that shown in FIG. 6 with a target height of 1.5 inches and a target diameter of 2.7 inches are produced using the present invention in accordance with the following:

Steel powder (Hoeganas 1000B blended with carbon) is fed through a pinch valve (Red Valve Series 2600, 1" diameter) controlled by an electronic regulator (Norgren Electronic Regulator) at a rate of approximately 250 grams/second onto a scale which rests on a load cell (Tedea Huntleigh Loadcell Model #9010), when the load cell registers approximately 250 grams the electronic regulator causes the pinch valve to be choked down to slow the feed of the powder onto the load cell. The pinch valve is completely shut off when the target weight (500 grams) has been registered on the load cell. The load cell is connected to the electronic regulator which is itself controlled by an analog signal. The powder initially falls through the pinch valve into a scale funnel having a closed flapper valve controlled with an electromagnetic solenoid valve (Dormeyer Industries B24253-A-7). The scale funnel is attached to the load cell. The load cell controller is programmed with target 500 grams per part weight as well as a slow feed and a dribble weight. The solenoid valve opens causing the flapper valve to open and weighed powder comes out and the flapper valve shuts. Powder falls into a pressure vessel having a pinch valve on top to open and close the vessel. The pinch valve closes sealing the ingress to the pressure vessel. The egress of the pressure vessel is connected to a feed tube (carbon/teflon composite with stainless sheathing SC8-608-608-66). The feed tube is attached at its distal end to an annular ring shaped feed system receptacle through a powder delivery conduit attached thereon. Pressurized air is provided to the pressure vessel by a pressure generator regulated by a regulator (Norgren Electronic Pressure Regulator R26-200-RMLA) through a prefilter capable of filtering out water and substances down to 5 microns in size, and then through a coalescing filter capable of removing substances down to a single micron in size. Air comes up to the electronic regulator (Norgren Air Pressure Regulator 11-018-110 with Dial PSI indicator) controlled by an analog signal. Air is exhausted through a filter and out through a poppit valve (Norgren 3-way Poppit Valve D1023H-CC1WA). At the time of filling, the electronic regulator is programmed with the appropriate amount of pressure which is controlled by a controller (Norgren Air Pressure Regulator 11-018-110 w/Dial PSI indicator). The upper punch of the powder press lowers to seal the top of the annular ring feed system receptacle, effectively sealing the system and the controller opens and shuts the poppit valves allowing air into the feed conduit and exhausting it out of the feed ring. The powder sits at the bottom of the pressure vessel and the poppit valve that lets air into the pressure vessel opens and pushes the powder through the feed tube into the feed system annular receptacle and ultimately into the die cavity. The poppit valve is in the off position on the exhaust portal of the annular feed system receptacle allowing for the exhaust of air from the die cavity. This exhaust portal is covered by a screen that is cleaned by forcing air through it in the direction opposite to that which the air is exhausted. The regulator drops the pressure in the pressure generator to the fluidization pressure and the powder in the die is subsequently fluidized by the rapid delivery and exhaust of pressure into and out of the die cavity. The relevant process parameters for this procedure are as follows:

Process

Feed Powder into die cavity—3 pulses of 1 second at 55 PSI and exhaust for 0.09 seconds.

Fluidize-8 pulses of 0.1 second at 10 PSI and exhaust for 0.09 seconds.

0.37" Interior Diameter Feed Tube

After powder is delivered to the die cavity, the powder is pressed between the upper and lower punches of the powder press to a density of 6.9 g/cc on a 220 ton Cincinatti press to make a sprocket having the following required part tolerances:

weight: ±0.6 grams (±3 sigma)

height: ±0.0009 inches (±3 sigma)

concentricity: ±0.0009 inches (±3 sigma)

concentricity tolerance of tool is ±0.006

The concentricity, height and weight measurements are taken of the thirty (30) parts so produced (concentricity is measured using a Mitotoyo BenchCenter) and the results are ported in Table 1:

TABLE 1

| Part # | Concentricity | | | | Press (PSI) | Height (inches) | Weight (grams) |
|---|---|---|---|---|---|---|---|
| | Back | Left | Front | Right | | | |
| 1 | .0000 | −.0005 | +.0015 | +.0015 | 120.2 | 1.44420 | 500.06 |
| 2 | .0000 | .0000 | +.0020 | +.0020 | 120.8 | 1.44530 | 500.42 |
| 3 | .0000 | .0000 | +.0015 | +.0010 | 119.9 | 1.44525 | 499.91 |
| 4 | .0000 | +.0010 | +.0025 | +.0015 | 120.9 | 1.44535 | 500.80 |
| 5 | .0000 | +.0005 | +.0025 | +.0010 | 119.9 | 1.44450 | 499.87 |
| 6 | .0000 | .0000 | +.0015 | +.0010 | 120.5 | 1.44495 | 500.36 |
| 7 | .0000 | .0000 | +.0015 | +.0010 | 120.3 | 1.44500 | 500.36 |
| 8 | .0000 | .0000 | +.0015 | +.0010 | 120.5 | 1.44495 | 500.27 |
| 9 | .0000 | .0000 | +.0010 | +.0000 | 120.5 | 1.44495 | 500.51 |
| 10 | .0000 | +.0005 | +.0020 | +.0010 | 120.3 | 1.44450 | 500.38 |
| 11 | .0000 | +.0005 | +.0025 | +.0015 | 120.6 | 1.44485 | 500.36 |
| 12 | .0000 | +.0005 | +.0020 | +.0010 | 120.5 | 1.44480 | 500.22 |
| 13 | .0000 | +.0010 | +.0025 | +.0015 | 120.3 | 1.44495 | 500.24 |
| 14 | .0000 | .0000 | +.0015 | +.0010 | 120.6 | 1.44490 | 500.32 |
| 15 | .0000 | .0000 | +.0025 | +.0015 | 120.6 | 1.44450 | 500.25 |
| 16 | .0000 | +.0005 | +.0020 | +.0015 | 120.6 | 1.44450 | 500.45 |
| 17 | .0000 | +.0005 | +.0025 | +.0010 | 120.8 | 1.44485 | 500.50 |
| 18 | .0000 | +.0010 | +.0020 | +.0005 | 121.0 | 1.44490 | 500.68 |
| 19 | .0000 | +.0005 | +.0025 | +.0010 | 120.6 | 1.44475 | 500.36 |
| 20 | .0000 | +.0010 | +.0020 | +.0015 | 120.5 | 1.44460 | 500.26 |
| 21 | .0000 | +.0010 | +.0020 | +.0010 | 120.8 | 1.44480 | 500.49 |
| 22 | .0000 | +.0005 | +.0025 | +.0015 | 121.2 | 1.44470 | 500.77 |
| 23 | .0000 | +.0005 | +.0025 | +.0015 | 120.6 | 1.44465 | 500.47 |
| 24 | .0000 | +.0005 | +.0025 | +.0015 | 120.6 | 1.44455 | 500.47 |
| 25 | .0000 | +.0005 | +.0020 | +.0010 | 120.2 | 1.44430 | 499.96 |
| 26 | .0000 | +.0001 | +.0025 | +.0010 | 120.6 | 1.44495 | 500.28 |
| 27 | .0000 | +.0005 | +.0025 | +.0015 | 120.9 | 1.44475 | 500.61 |
| 28 | .0000 | +.0005 | +.0020 | +.0015 | 119.6 | 1.44370 | 499.60 |
| 29 | .0000 | +.0005 | +.0025 | +.0015 | 121.3 | 1.44520 | 500.75 |
| 30 | .0000 | +.0005 | +.003 | +.0015 | 121.0 | 1.44465 | 500.63 |

Figure 7:
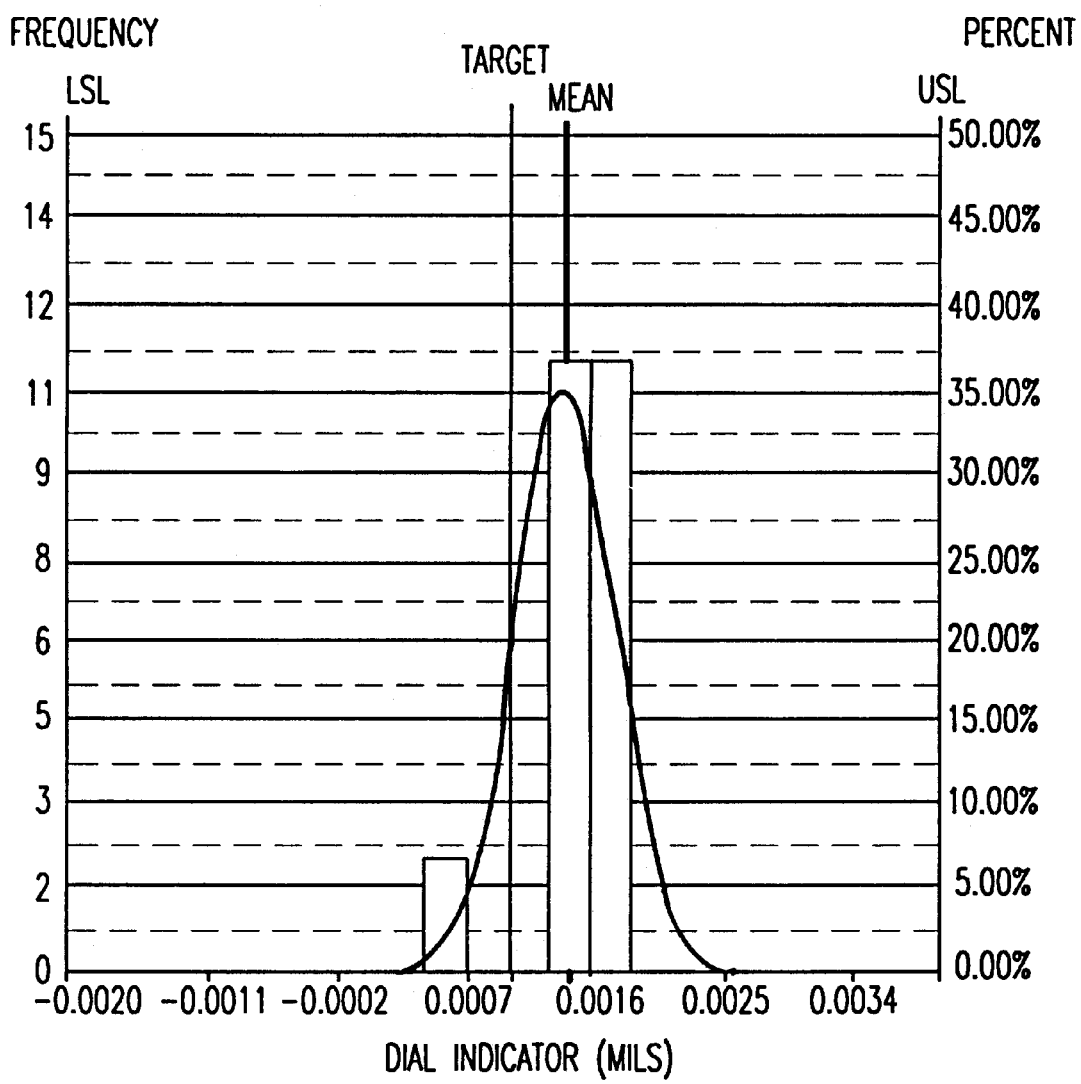
FIG. 7 is a histogram of the concentricity values of a series of thirty parts made according to the present invention.

Concentricity measurements are plotted on a histogram shown as FIG. 7, wherein the measurements are plotted versus the frequency of occurrence. The number of samples within a range of concentricity values are grouped to show the variability of concentricity about the target value.

Figure 8:
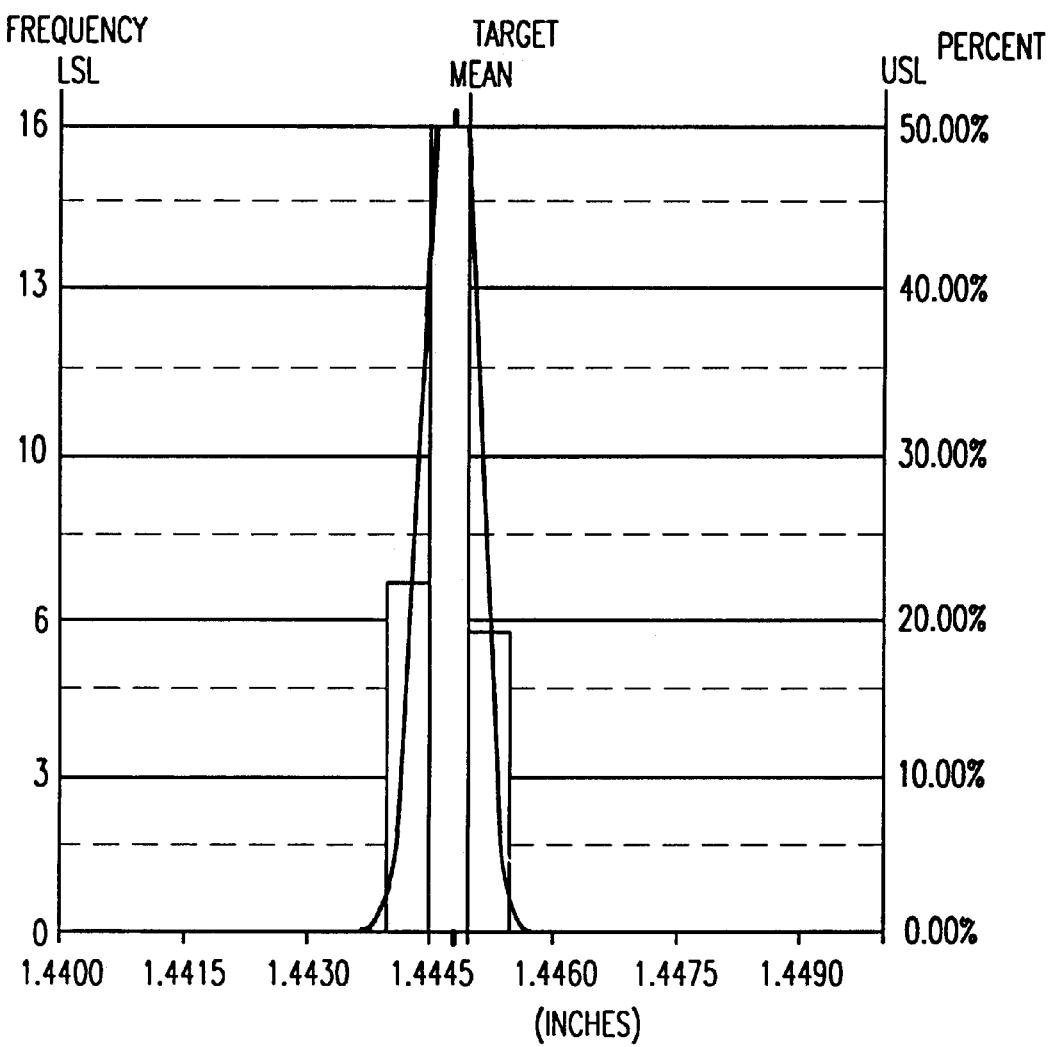
FIG. 8 is a histogram of the height values of a series of thirty parts made according to the present invention.

Height measurements are plotted on a histogram shown as FIG. 8, wherein the measurements are plotted versus the frequency of occurrence. The number of samples within a range of height values are grouped to show the variability of cocentricity about the target value.

Figure 9:
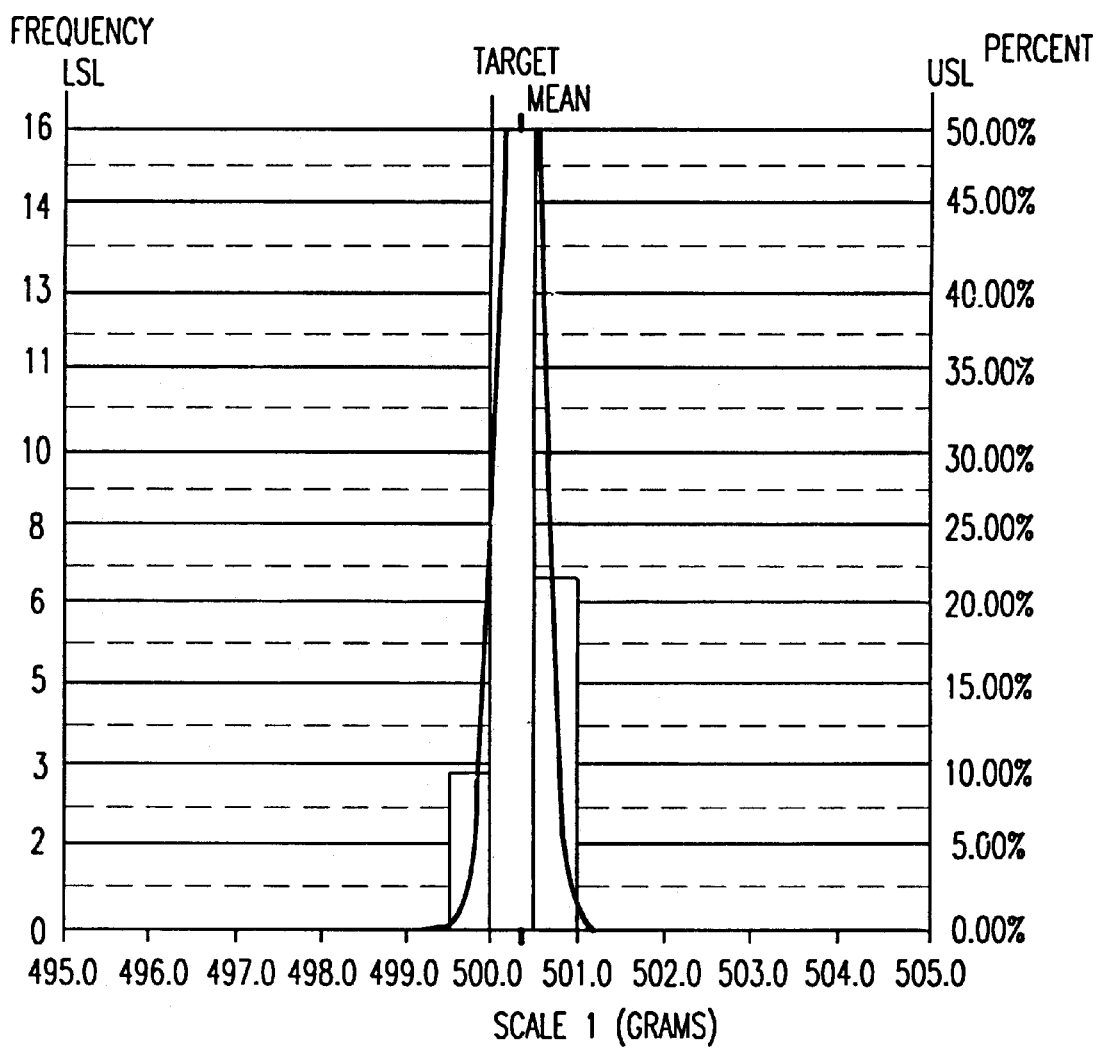
FIG. 9 is a histogram of the height values of a series of thirty parts made according to the present invention.

Weight measurements are plotted on a histogram shown as FIG. 9, wherein the measurements are plotted versus the frequency of occurrence. The number of samples within a range of weight values are grouped to show the variability of concentricity about the target value.

Example 2

Thirty 500 gram parts were produced in accordance with the procedure outlined in Example 1 using the following parameters:

Feed Pulse: 3 pulses of 1 second at 25 PSI, exhaust for 0.09 sec.

Fluidize: 8 pulses of 1 second at 12 PSI, exhaust for 0.09 seconds The height and weight of the parts are measured and the results are shown in Table 2:

TABLE 2

| Part # | Height (inches) | Weight (grams) |
|---|---|---|
| 100 | 1.4435 | 500.04 |
| 101 | 1.4435 | 500.03 |
| 102 | 1.4435 | 500.1 |
| 103 | 1.4436 | 500.01 |
| 104 | 1.4436 | 500.03 |
| 105 | 1.4437 | 499.92 |
| 106 | 1.4439 | 500.06 |
| 107 | 1.4438 | 499.93 |
| 108 | 1.4434 | 499.92 |
| 109 | 1.4433 | 499.82 |
| 110 | 1.4432 | 499.92 |
| 111 | 1.4435 | 500.02 |
| 112 | 1.4432 | 499.53 |
| 113 | 1.4425 | 500.03 |
| 114 | 1.4441 | 500.08 |
| 115 | 1.4435 | 499.97 |
| 116 | 1.4437 | 500.26 |
| 117 | 1.4438 | 499.78 |
| 118 | 1.4426 | 499.74 |
| 119 | 1.4430 | 500.11 |
| 120 | 1.4432 | 499.7 |
| 121 | 1.4430 | 499.87 |
| 122 | 1.4430 | 499.95 |
| 123 | 1.4438 | 499.93 |
| 124 | 1.4429 | 499.93 |
| 125 | 1.4427 | 499.64 |
| 126 | 1.4424 | 500.03 |
| 127 | 1.4433 | 499.97 |
| 128 | 1.4430 | 500.02 |
| 129 | 1.4428 | 499.74 |
| 130 | 1.4431 | 500.04 |

Figure 10:
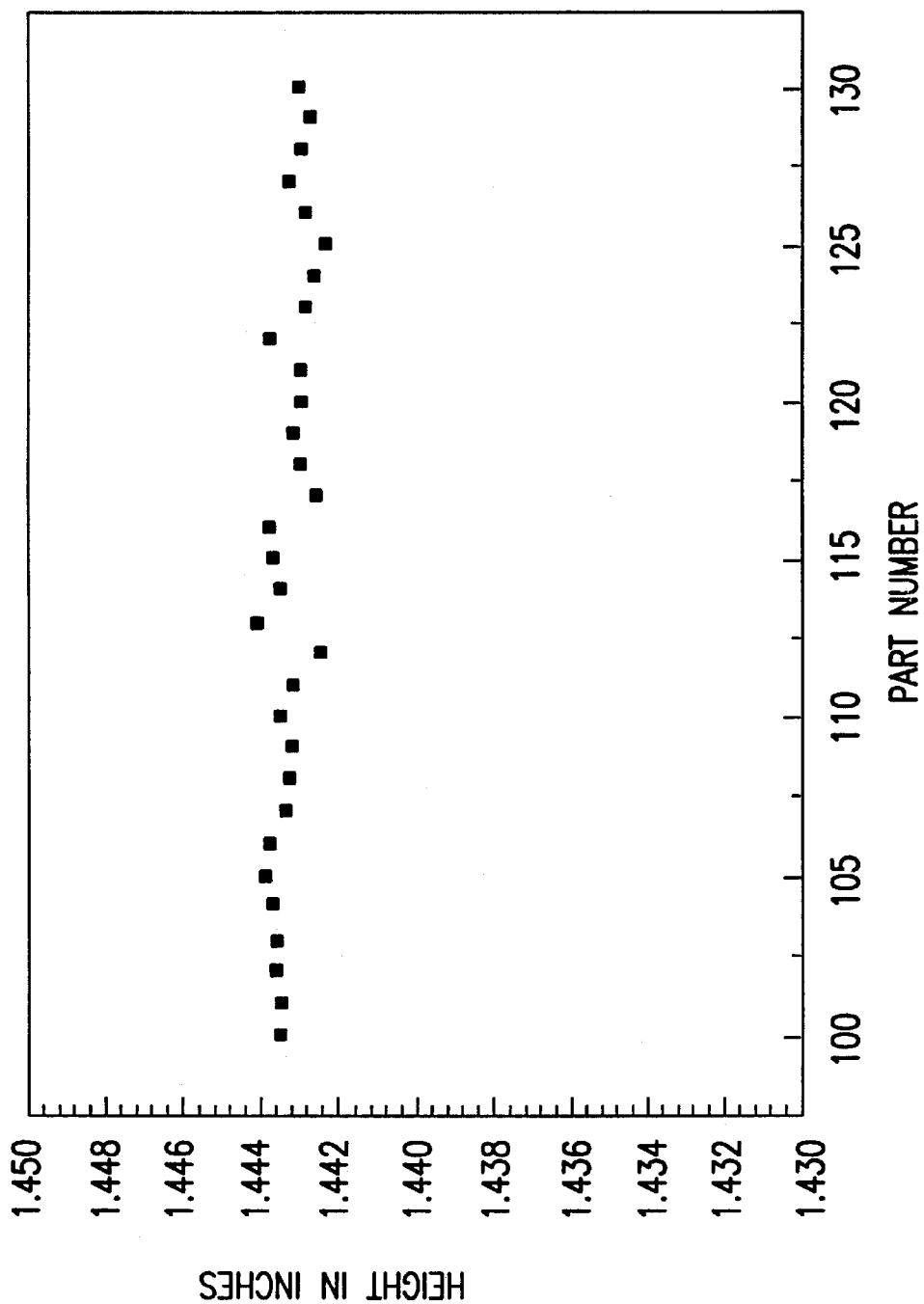
FIG. 10 is a graph depicting the height accuracy of thirty consecutive parts made according to the present invention.

The height measurements (in inches) for each of the thirty parts are plotted on a graph shown as FIG. 10 that shows minimal variation in part height.

Figure 11:
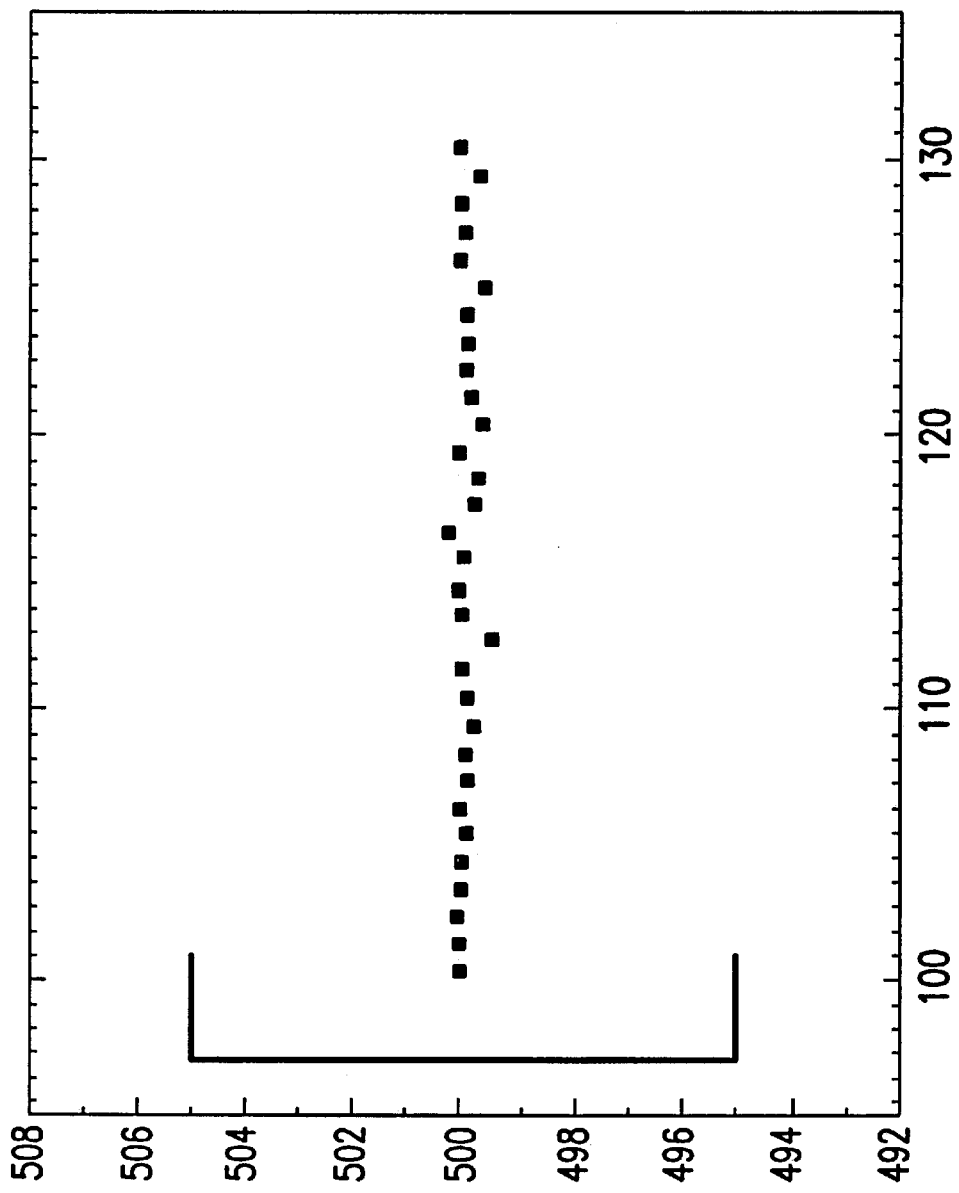
FIG. 11 is a graph depicting the weight accuracy of the present invention powder feed system for a part having a target weight of 500 grams. The graph shows thirty repetitions of the feed cycle and illustrates the reproducibility of the weighing system.

The weight measurements (in grams) for each of the thirty parts are plotted on a graph shown as FIG. 11. Each measurement is indicated on the graph as ■. The area between the bracket shows the variability expected using the Best Industrial Practice.

Example 3

Thirty 500 gram parts were produced in accordance with the procedure outlined in Example 1 using the following parameters:

Feed Pulse: 3 pulses of 40 PSI for 1 second, exhaust for 0.09 seconds.

Fluidize: 8 pulses of 12 PSI for 1 second, exhaust for 0.09 second.

The concentricity of the resultant parts are measured and are found to be as followed:

| Part # | Back | Front | side 1 | side 2 |
|---|---|---|---|---|
| 200 | 0.0000 | −0.00075 | −0.002 | 0.001 |
| 201 | 0.0000 | 0.0000 | −0.002 | 0.001 |
| 202 | 0.0000 | 0.002 | −0.002 | 0.001 |
| 203 | 0.0000 | −0.002 | −0.002 | 0.001 |
| 204 | 0.0000 | −0.003 | −0.002 | 0.001 |
| 205 | 0.0000 | −0.001 | −0.002 | 0.001 |
| 206 | 0.0000 | 0.0000 | −0.002 | 0.001 |
| 207 | 0.0000 | 0.0000 | −0.002 | 0.001 |
| 208 | 0.0000 | 0.002 | −0.002 | 0.001 |
| 209 | 0.0000 | 0.002 | −0.002 | 0.001 |
| 210 | 0.0000 | −0.002 | −0.002 | 0.001 |
| 211 | 0.0000 | 0.003 | −0.002 | 0.001 |
| 212 | 0.0000 | −0.001 | −0.002 | 0.001 |
| 213 | 0.0000 | 0.0015 | −0.002 | 0.001 |
| 214 | 0.0000 | 0.0000 | −0.002 | 0.001 |
| 215 | 0.0000 | −0.0025 | −0.002 | 0.001 |
| 216 | 0.0000 | −0.003 | −0.002 | 0.001 |
| 217 | 0.0000 | −0.0035 | −0.002 | 0.001 |

-continued

| Part # | Back | Front | side 1 | side 2 |
| --- | --- | --- | --- | --- |
| 218 | 0.0000 | −0.001 | −0.002 | 0.001 |
| 219 | 0.0000 | −0.00125 | −0.002 | 0.001 |
| 220 | 0.0000 | −0.0035 | −0.002 | 0.001 |
| 221 | 0.0000 | 0.001 | −0.002 | 0.001 |
| 222 | 0.0000 | −0.0005 | −0.002 | 0.001 |
| 223 | 0.0000 | 0.0000 | −0.002 | 0.001 |
| 224 | 0.0000 | −0.002 | −0.002 | 0.001 |
| 225 | 0.0000 | 0.0000 | −0.002 | 0.001 |
| 226 | 0.0000 | −0.0035 | −0.002 | 0.001 |
| 227 | 0.0000 | 0.0005 | −0.002 | 0.001 |
| 228 | 0.0000 | −0.002 | −0.002 | 0.001 |
| 229 | 0.0000 | 0.001 | −0.003 | 0.001 |
| 230 | 0.0000 | 0.0000 | −0.003 | 0.0000 |

Figure 12:
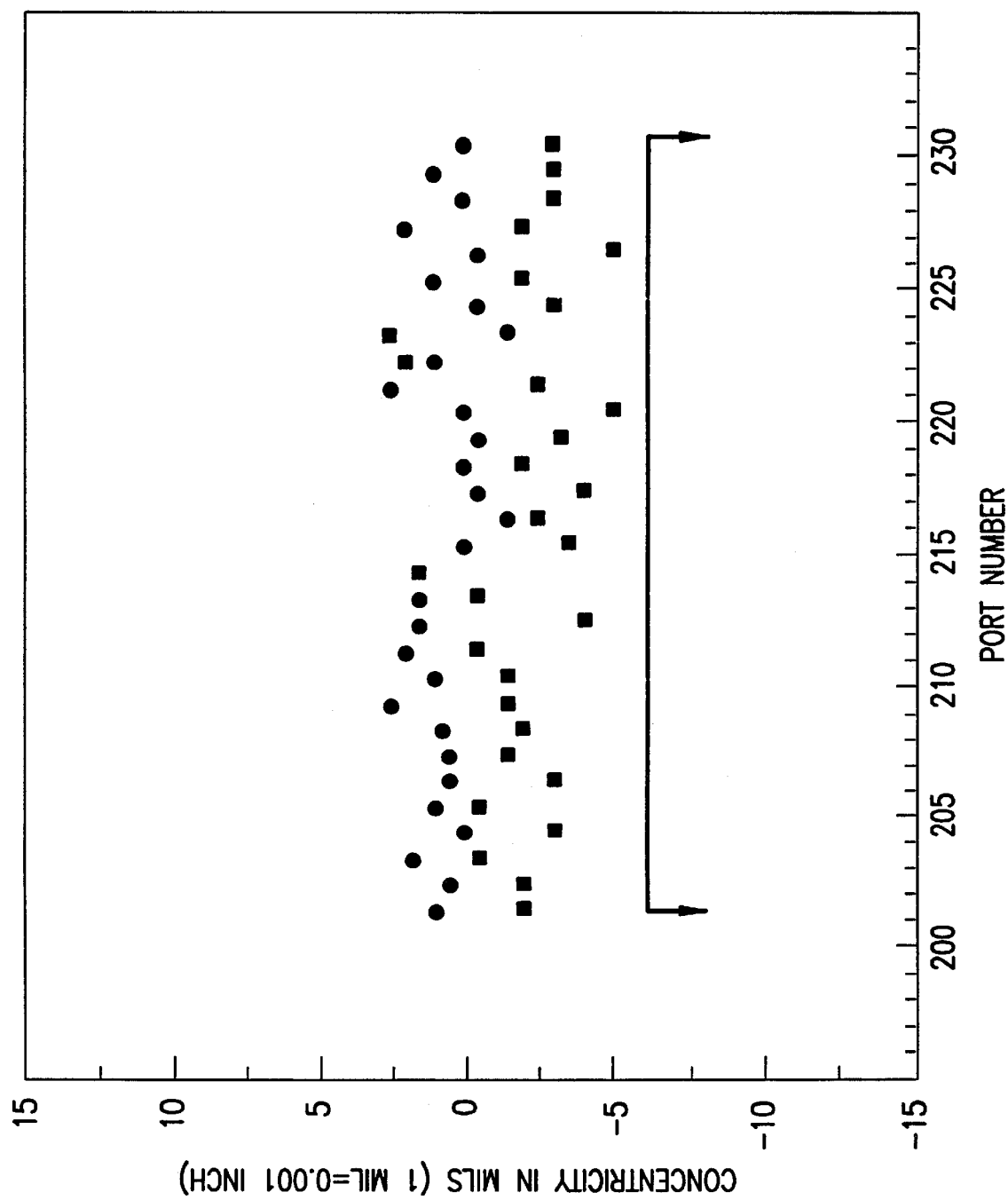
FIG. 12 is a graph depicting the limited variation in concentricity for thirty consecutive gears having a 2.7 inch target diameter.

These concentricity values are plotted on a graph shown as FIG. 12. Left side values are indicated by ●. Right side values are indicated by ■. The area below the bracket shows the area of the graph on which values obtained using the Best Industrial Practice would be expected to fall.

The present invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A system that delivers a particulate material to a die cavity, comprising:
   means for delivering a quantity of particulate material to the die cavity; and
   means for fluidizing the particulate material within the die cavity to evenly distribute the particulate material so that it is substantially uniform in density throughout the die cavity.

2. The system according to claim 1, wherein the means for delivering comprises a pressurized feed shoe.

3. The system according to claim 2, wherein the pressurized feed shoe comprises:
   a feed shoe body comprising a vessel that receives a quantity of the particulate material; and
   a shuttle that enables selective movement of the feed shoe body into and out of registration with the die cavity.

4. The system according to claim 3, further comprising a pressure generator that generates supra-atmospheric pressure within the vessel.

5. The system according to claim 2, further comprising a mechanical linkage enabling the pressurized feed shoe to move into registration with the die cavity.

6. The system according to claim 5, wherein the mechanical linkage enables positioning of the pressurized feed shoe out and down over the die cavity.

7. The system according to claim 1, wherein the means for delivering comprises a shuttleless system.

8. The system according to claim 7, wherein the shuttleless system comprises a receptacle fixed to the die cavity.

9. The system according to claim 1, wherein said means for fluidizing the particulate material comprises a pressure generator that applies a series of at least one pressure pulse into an interior of the die cavity, each said at least one pressure pulse comprising supra-atmospheric pressure delivered into the interior of the die cavity.

10. The system according to claim 9, wherein the series of at least one pressure pulse comprises from about 2 to about 100 pressure pulses.

11. The system according to claim 1, wherein the means for delivering comprises a pressurized feed shoe, and the means for fluidizing comprises a series of at least one supra-atmospheric pressure pulse delivered into an interior of the cavity.

12. The system according to claim 11, further comprising a pressure generator that produces said series of at least one super-atmospheric pressure pulse.

13. The system according to claim 12, wherein the pressure generator also applies supra-atmospheric pressure to the pressurized feed shoe to push the particulate material from behind into the die cavity.

14. A system that delivers a particulate material to a die cavity, comprising:
   a pressurized feed shoe having a feed shoe body comprising a vessel that receives a quantity of the particulate material;
   a shuttle that moves the feed shoe body into and out of registration with the die cavity; and
   a pressure generator that applies supra-atmospheric pressure to the vessel of the feed shoe body to push the particulate material into the die cavity, the pressure generator also applying a series of at least one supra-atmospheric pressure pulse into an interior of the die cavity to fluidize the particulate material.

15. The system according to claim 14, wherein the series of at least one supra-atmospheric pressure pulse comprises about 2 to about 100 pressure pulses.

16. The system according to claim 14, wherein the shuttle moves the feed shoe body in a horizontal plane elevated above and transverse to the die cavity to a position whereby an egress opening of the feed shoe body overhangs said die cavity and downwardly moves said feed shoe body to register said egress opening with the die cavity.

17. The system according to claim 16, further comprising a valve associated with said at least one egress opening having a closed portion for containing particulate material inside said vessel and an open position for delivering particulate material to said die cavity when said egress opening registers with the die cavity.

18. The system according to claim 17, further comprising a lock for maintaining said feed shoe body in the downward position whereby said egress opening remains in registration with said die cavity while particulate material fills the die cavity.

19. The system according to claim 8, further comprising a second conduit extending from a source of liquid solution through the interior of said feed shoe body, said second conduit delivering liquid solution to the particulate material in the vessel of the feedshoe body.

20. A method for delivering a particulate material to a die cavity, comprising:
   receiving a quantity of particulate material within a vessel of a pressurized feed shoe;
   moving the pressurized feed shoe into and out of registration with the die cavity;
   applying supra-atmospheric pressure to the vessel of the pressurized feed shoe to push the particulate material into the die cavity; and
   applying a series of at least one supra-atmospheric pressure pulse into an interior of the die cavity to fluidize the particulate material.

21. A powder feed system comprising:
- a feed shoe comprising a vessel for receiving and storing particulate material to be delivered to a die cavity, a feed conduit and a receptacle; and
- an air flow generator which supplies air to the vessel for mixing air with the material in the vessel to create a material/air mixture;
- wherein said feed conduit and said receptacle are configured to deliver the material/air mixture to the die cavity from the vessel such that the material/air mixture is in a fluidized state when it enters the die cavity, the receptacle having an egress that can be placed in communication with the die cavity.

22. A powder feed system according to claim 21, wherein said receptacle has a top surface and a bottom surface, with an ingress in the top surface to receive the material/air mixture from the feed conduit and said egress in the bottom surface.

23. A powder feed system according to claim 22, further comprising a shuttle for reciprocating said feed shoe between a first position wherein the egress is not in communication with a die cavity and a second position wherein the egress is in communication with the die cavity.

24. A powder feed system comprising:
- a feed shoe including a vessel for receiving and storing particulate material to be delivered by the powder feed system to a die cavity and a feed conduit and a receptacle for delivering the particulate material from the vessel to the die cavity; and
- an air flow generator connected to the feed shoe for delivering air to the feed shoe to produce a material/air mixture and to transport the material/air mixture from the vessel to the die cavity such that the material/air mixture enters the cavity in a fluidized state to create a substantially uniform density distribution of the material in the die cavity.

25. A powder feed system according to claim 24, wherein the feed shoe has an egress, and wherein the powder feed system includes a shuttle for reciprocating said feed shoe between a first position in which the egress is not in communication with a die cavity and a second position in which the egress is in communication with the die cavity.

26. A powder feed system according to claim 25, wherein the particulate material is fed from said egress downwardly to the top of the die cavity.

27. A powder feed system comprising:
- a feed shoe including a vessel, a feed conduit and a receptacle, said vessel being configured to contain and store particulate material to be delivered to a die cavity via said feed conduit and said receptacle; and
- at least one air flow generator connected to said feed shoe for creating a fluidized material/air mixture in said vessel, said feed conduit, said receptacle and said die cavity so that the material is substantially evenly distributed in said die cavity.

28. A powder feed system according to claim 27, wherein the feed shoe has an egress, and wherein the powder feed system includes a shuttle for reciprocating said feed shoe between a first position in which the egress is not in communication with said die cavity and a second position in which the egress is in communication with said die cavity.

29. A method of conveying particulate material from a storage vessel in a feed shoe to a die cavity and filling the die cavity with the material, comprising the steps of:
- fluidizing the particulate material in the storage vessel; and
- transporting the fluidized particulate material to the die cavity, wherein said particulate material enters the die cavity in a fluidized state.

30. A method of transporting particulate material according to claim 29, further comprising the step of:
- reciprocating the feed shoe between a first position in which an egress of the feed shoe is in communication with the die cavity and a second position in which the egress is not in communication with the die cavity.

31. A method of transporting particulate material from a storage vessel in a feed shoe, through a feed conduit and receptacle of the feed shoe, to a die cavity, comprising the steps of:
- providing the particulate material in the storage vessel,
- transporting a quantity of the particulate material to the die cavity through the feed conduit and receptacle, and
- fluidizing the particulate material in the storage vessel, feed conduit and receptacle, wherein the particulate material is fluidized when it reaches the die cavity.

32. A method of conveying particulate material according to claim 31, further comprising the step of:
- reciprocating the feed shoe between a first position in which an egress of the feed shoe is in communication with the die cavity and a second position in which the egress is not in communication with the die cavity.

33. A method of conveying particulate material according to claim 32, wherein the particulate material is fed downwardly from the egress into the top of the die cavity.

34. A method of conveying particulate material from a storage vessel in a feed shoe to a die cavity via a feed conduit and receptacle of the feed shoe, comprising the steps of:
- providing the particulate material in the storage vessel and transporting the material from the storage vessel through the feed conduit and the receptacle to the die cavity, and
- providing at least one air flow source connected to the feed shoe for creating a fluidized material/air mixture in the vessel, the feed conduit, the receptacle and the die cavity so that the material is substantially evenly distributed in the die cavity.

35. A method of conveying particulate material according to claim 34, further comprising the step of:
- reciprocating the feed shoe between a first position in which an egress of the feed shoe is in communication with the die cavity and a second position in which the egress is not in communication with the die cavity.

* * * * *